(12) United States Patent
Tagome et al.

(10) Patent No.: US 7,095,195 B2
(45) Date of Patent: Aug. 22, 2006

(54) MOTOR AND DISK DRIVE APPARATUS

(75) Inventors: Masaki Tagome, Hirakata (JP); Hideaki Mori, Sakai (JP); Hisanori Nagase, Ibaraki (JP); Makoto Gotou, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 98 days.

(21) Appl. No.: 10/812,289

(22) Filed: Mar. 29, 2004

(65) Prior Publication Data
US 2004/0222758 A1 Nov. 11, 2004

(30) Foreign Application Priority Data
Apr. 4, 2003 (JP) ............................. 2003-101826

(51) Int. Cl.
*H02P 7/00* (2006.01)
(52) U.S. Cl. .................... 318/268; 318/255; 318/59; 318/257
(58) Field of Classification Search ................ 318/268, 318/255, 59, 257
See application file for complete search history.

(56) References Cited

U.S. PATENT DOCUMENTS 5,323,093 A * 6/1994 Kikuchi ...................... 318/254
5,886,489 A * 3/1999 Rowan et al. ............... 318/439

FOREIGN PATENT DOCUMENTS

| JP | 04222489 A | * | 8/1992 |
| JP | 04312387 A | * | 11/1992 |
| JP | 08223970 A | | 8/1996 |
| JP | 11004595 A | | 1/1999 |

* cited by examiner

*Primary Examiner*—Rita Leykin
(74) *Attorney, Agent, or Firm*—Akin Gump Strauss Hauer & Feld, LLP

(57) ABSTRACT

In a motor and a disk drive apparatus in accordance with the present invention, a position detecting part 30 comprises a detection signal switching circuit 39A, a noise elimination circuit 38 and a detection circuit 39B, and the detection signal switching circuit 39A is configured to output an inverted detection signal obtained by logically inverting a detection signal until the rotation speed reaches a predetermined rotation speed after the beginning of starting or until a position detection pulse signal FG is detected a predetermined number of times; position detection operation is carried out only during the ON operation of PWM, whereby PWM sensorless starting is carried out.

15 Claims, 21 Drawing Sheets

MOTOR AND DISK DRIVE APPARATUS

BACKGROUND OF THE INVENTION

The present invention relates to a motor for carrying out PWM sensorless driving and to a disk drive apparatus using the motor.

FIG. 21 is a block diagram showing the configuration of a conventional motor. The operation of the conventional motor will be described briefly by using this FIG. 21. A rotor 1010 has a field part formed of a permanent magnet and generates a rotation force by virtue of interaction with three-phase windings 1011, 1012 and 1013. A power supplying part 1020 comprises three high-side power transistors and three low-side power transistors. The respective high-side and low-side power transistors are connected in series, and one terminal of each winding of a phase is connected to the connection point. The power supplying part 1020 comprising the high-side power transistors and the low-side power transistors supplies electric power to the windings 1011, 1012 and 1013. A position detecting part 1030 compares the terminal voltages V1, V2 and V3, each generated at one terminal of each of the windings 1011, 1012 and 1013, with the common voltage Vc generated at the other terminals, and outputs a position detection pulse signal FG in response to the result of the comparison. A commanding part 1040 outputs a speed command signal EC for controlling the speed of the rotor 1010 to a switching controlling part 1050. The switching controlling part 1050 outputs a PWM signal Wp for high-frequency switching the power transistors of the power supplying part 1020 to an activation controlling part 1060 in response to the speed command signal EC of the commanding part 1040. The activation controlling part 1060 outputs activation control signals N1, N2, N3, M1, M2 and M3 for controlling activation to the windings 1011, 1012 and 1013 to the power supplying part 1020 in response to the position detection pulse signal FG of the position detecting part 1030 and the PWM signal Wp of the switching controlling part 1050. Hence, the power supplying part 1020 supplies activation-controlled electric power to the windings 1011, 1012 and 1013, whereby the rotor 1010 is driven by PWM sensorless operation.

In addition, in the conventional motor, in order that the detection of the rotor position is prevented from malfunctioning, an output signal subjected to masking depending on high-frequency switching operation is used as a position detection signal for activation switching. A conventional motor having this kind of configuration is disclosed in the gazette of Japanese unexamined Patent Application, Publication No. Hei 11-4595, for example.

In the conventional motor configured as described above, when high-frequency switching operation is OFF, the neutral point of the windings is pulled to the power supply voltage or the ground voltage, whereby it is difficult to carry out position detection operation. As a motor for solving this kind of problem, a motor having a different configuration, such as the motor disclosed in the gazette of Japanese unexamined Patent Application, Publication No. Hei 0.8-223970, is available. In this conventional motor, position detection operation was carried out only during the ON operation of high-frequency switching operation.

However, the configuration of the above-mentioned conventional motor has problems described below. In the conventional motor, the position detecting part 1030 compares the terminal voltages V1, V2 and V3, each generated at one terminal of each of the windings 1011, 1012 and 1013, with the common voltage Vc, and outputs the position detection pulse signal FG to the activation controlling part 1060 in response to the result of the comparison; the activation controlling part 1060 outputs high-side activation control signals N1, N2 and N3 and low-side activation control signals M1, M2 and M3 to the power supplying part 1020 in response to the position detection pulse signal FG. Hence, the power supplying part 1020 supplies electric power to the windings 1011, 1012 and 1013, thereby carrying out the sensorless driving of the motor. Therefore, when the position detecting part 1030 erroneously detects the position of the rotor at the beginning of starting, sensorless driving is carried out while activation control is done according to the information detected erroneously; hence, there was a problem of having a high possibility of causing a starting failure in the conventional motor.

Since the position of the rotor is indefinite and the rotation speed thereof is low at the beginning of starting, the counter electromotive voltages induced in the windings 1011, 1012 and 1013 are small, and it is difficult to accurately detect the position of the rotor. Hence, in the sensorless driving of the conventional motor, a starting failure may occur, resulting in a serious problem. In particular, in the case when the motor is started by PWM sensorless operation, since an induced voltage owing to the change in current due to PWM operation is superimposed on the terminal voltage of a detection phase, the position of the rotor is erroneously detected under the influence of the induced voltage generated at the time of PWM sensorless starting, whereby a starting failure may occur. Hence, as another conventional motor, an apparatus is available that is configured so as to be started after the rotor is attracted to a specific phase at the time of starting so that its position is fixed. In the motor having this kind of configuration, rotor movement time for initial position fixing is required; this causes a problem of extending starting time.

SUMMARY OF THE INVENTION

In order to solve the problems in the above-mentioned conventional motors, the present invention is intended to provide a motor configured considering the influence of an induced voltage owing to the change in current due to PWM operation in PWM sensorless driving and being capable of carrying out stable PWM sensorless driving, and to provide a disk drive apparatus using this motor.

A motor in accordance with the present invention comprises:

a rotor;

windings of a plurality of phases;

power supplying means, including a plurality of first drive power transistors and a plurality of second drive power transistors, for supplying electric power to the windings of a plurality of phases;

position detecting means for detecting the rotation position of the rotor in response to the terminal voltages of the windings of a plurality of phases;

activation controlling means for controlling activation to the windings of a plurality of phases by the power supplying means in response to a position signal output from the position detecting means;

commanding means for outputting a speed command signal; and switching operation means for causing at least one of the plurality of first drive power transistors and the plurality of second drive power transistors of the power supplying means to perform high-frequency switching operation in response to the speed command signal;

and that the position detecting means is provided with position detection signal switching means that carries out switching between a detection signal for detecting the rotation position of the rotor and an inverted detection signal generated by inverting the logic of the detection signal and outputs the obtained signal in response to voltage comparison signals obtained by the comparison outputs between each of the terminal voltages of the windings of non-activation phases and the neutral point voltage of the common potential of the windings of a plurality of phases, and the output signal of the position detection signal switching means is used as the position signal during the ON operation of the high-frequency switching operation.

With this configuration, since the motor in accordance with the present invention carries out position detection during the ON operation of switching operation, the position detection is carried out only in the case when the amount of current change due to PWM operation is positive, and an inverted detection signal generated by inverting the logic of the detection signal obtained at the time is output from the position detection signal switching means, whereby a starting failure owing to an induced voltage can be prevented. As a result, the motor in accordance with the present invention can carry out stable PWM sensorless starting.

The above-mentioned motor in accordance with the present invention comprises state judging means for making a judgment as to whether the rotation speed of the above-mentioned rotor, obtained on the basis of the above-mentioned position signal, is higher than a predetermined rotation number or not and for outputting a state judgment signal in the case when the rotation speed is higher than the above-mentioned predetermined rotation number, wherein the above-mentioned position detection signal switching means carries out switching between the detection signal for detecting the rotation position of the above-mentioned rotor and the inverted detection signal generated by inverting the logic of the above-mentioned detection signal when the above-mentioned state judgment signal is input at least once.

With this configuration, after getting out of a state wherein the position is detected erroneously under the influence of an induced voltage in the case when PWM sensorless starting is carried out, stable operation can be attained during steady rotation by using the above-mentioned detection signal as the position signal by the position detection signal switching means.

The motor in accordance with the present invention may be configured as such that the position detection signal switching means carries out switching between the detection signal for detecting the rotation position of the rotor and the inverted detection signal generated by inverting the logic of the detection signal when the position signal is input at least once.

The motor in accordance with the present invention may be configured as such that the position detection signal switching means carries out switching between the detection signal for detecting the rotation position of the rotor and the inverted detection signal generated by inverting the logic of the detection signal when a signal obtained by the AND operation of the state judgment signal generated at least once and the position signal generated at least once is input.

The motor in accordance with the present invention may be configured as such that the position detection signal switching means is provided with switching operation judging means for makes a judgment as to whether the high-frequency switching operation is carried out or not, and switching is carried out between the detection signal for detecting the rotation position of the rotor and the inverted detection signal generated by inverting the logic of the detection signal when a PWM operation state judgment signal obtained by the AND operation of a PWM operation signal output from the high-frequency switching operation judging means and the state judgment signal is input in the case when the high-frequency switching operation is carried out at least once.

The motor in accordance with the present invention may be configured as such that the switching operating means outputs a third predetermined time including the time of change from OFF to ON of the high-frequency switching operation and a fourth predetermined time including the time of change from ON to OFF of the high-frequency switching operation as mask signals.

The motor in accordance with the present invention may be configured so as to comprise forced high-frequency switching means for forcibly carrying out the high-frequency switching operation at least once within a second predetermined time in the case when the PWM operation signal is not output in response to the speed command signal within a first predetermined time after the state of activation starting, wherein the second predetermined time is set at a time elapsed until the state judgment signal is output.

The motor in accordance with the present invention may be configured as such that the position detecting means detects the rotation position of the rotor by directly comparing the terminal voltages of the windings of a plurality of phases with the voltage at the neutral point of the windings of a plurality of phases or a neutral point voltage artificially formed from the terminal voltages of the windings of a plurality of phases.

A disk drive apparatus in accordance with the present invention comprises:

head means for at least carrying out signal reproduction from a disk or carrying out signal recording on the disk;

information processing means for at least processing the output signal of the head means and outputting a reproduced information signal or processing and outputting a recorded information signal to the head means;

a rotor for directly rotating and driving the disk;

windings of a plurality of phases;

power supplying means, including a plurality of first drive power transistors and a plurality of second drive power transistors, for supplying electric power to the windings of a plurality of phases;

position detecting means for detecting the rotation position of the rotor in response to the terminal voltages of the windings of a plurality of phases;

activation controlling means for controlling activation to the windings of a plurality of phases by the power supplying means in response to a position signal output from the position detecting means;

commanding means for outputting a speed command signal; and switching operation means for causing at least one of the plurality of first drive power transistors and the plurality of second drive power transistors of the power supplying means to perform high-frequency switching operation in response to the speed command signal;

and that the position detecting means is provided with position detection signal switching means that carries out switching between a detection signal for detecting the rotation position of the rotor and an inverted detection signal generated by inverting the logic of the detection signal and outputs the obtained signal in response to voltage comparison signals obtained by the comparison outputs between each of the terminal voltages of the windings of non-activation phases and the neutral point voltage of the common potential of the windings of a plurality of phases, and the output signal of the position detection signal switching means is used as the position signal during the ON operation of the high-frequency switching operation.

With this configuration, since the disk drive apparatus in accordance with the present invention carries out position detection during the ON operation of switching operation, the position detection is carried out only in the case when the amount of current change due to PWM operation is positive, and an inverted detection signal generated by inverting the logic of the detection signal obtained at the time is output from the position detection signal switching means, whereby a starting failure owing to an induced voltage can be prevented. As a result, the disk drive apparatus in accordance with the present invention can securely carry out stable PWM sensorless starting.

The configuration and operation of a motor and a disk drive apparatus in accordance with the present invention will be described in detail in Embodiments.

While the novel features of the invention are set forth particularly in the appended claims, the invention, both as to configuration and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments in accordance with the present invention will be described below referring to the accompanying drawings.

Embodiment 1

Figure 1:
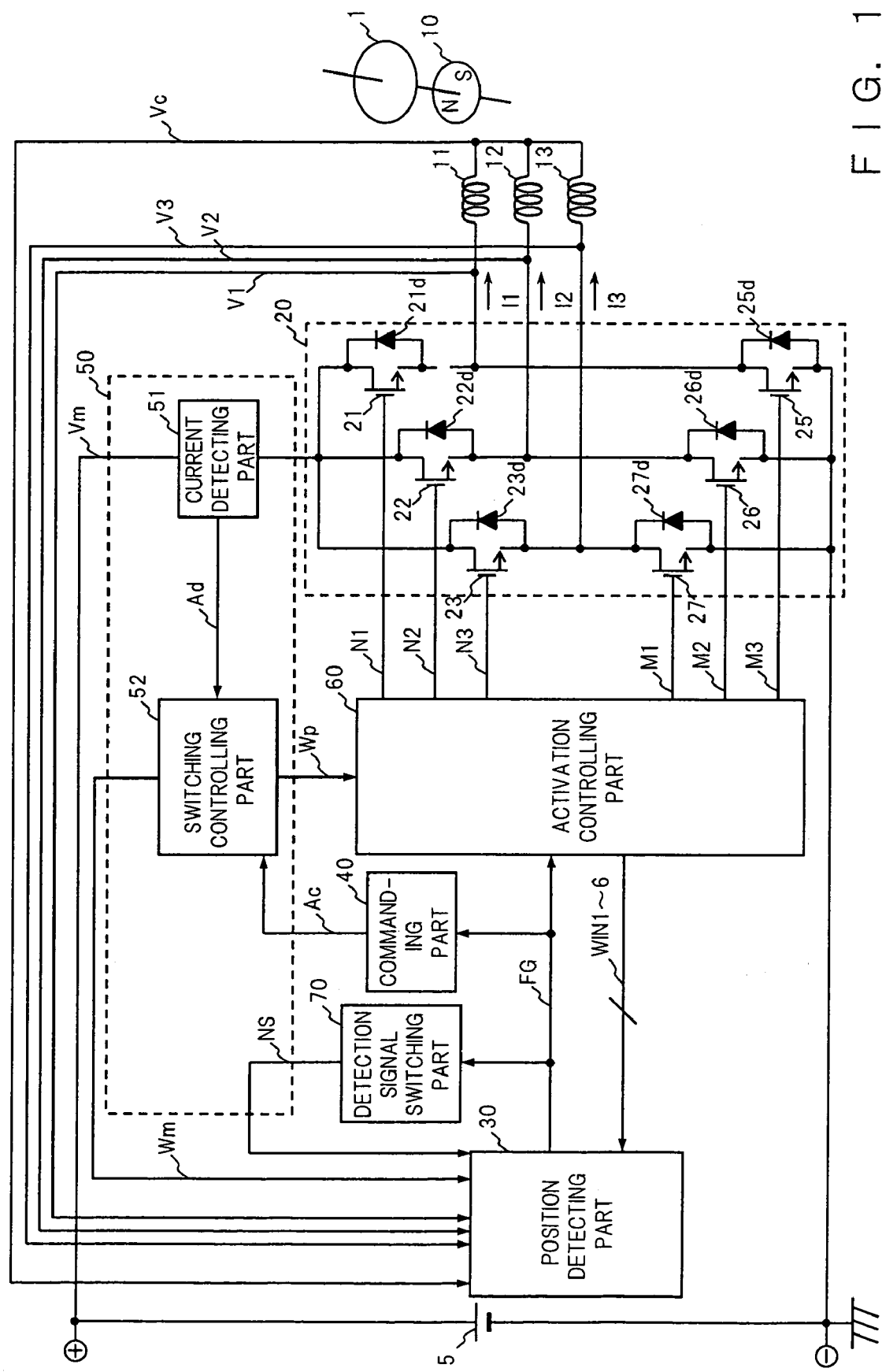
FIG. 1 is a block diagram showing an overall configuration of a motor in accordance with Embodiment 1 of the present invention.

FIG. 1 to FIG. 4 show a motor in accordance with Embodiment 1 of the present invention. FIG. 1 is a block diagram showing the configuration of the motor in accordance with Embodiment 1.

In FIG. 1, a rotor 10 is provided with a field part generating field fluxes of a plurality of poles by using magnetic fluxes generated from a permanent magnet. Three-phase windings 11, 12 and 13 are provided on a stator serving as a stationary member, and the windings 11, 12 and 13 of the respective phases are disposed so as to be displaced from each other by an electrical angle of about 120 degrees with respect to the rotor 10. One terminal of each of the windings 11, 12 and 13 is connected to a power supplying part 20, and the other terminals are connected commonly. The three-phase windings 11, 12 and 13 generate three-phase magnetic fluxes by using three-phase drive currents I1, I2 and I3, and generates a drive force by virtue of the interaction with the rotor 10, thereby rotating the rotor 10 and a disk 1 mounted on this rotor 10.

A DC power source 5 serving as a power supply source supplies a required DC voltage Vm to its positive terminal while its negative terminal is set at the ground potential. The current inflow terminals of three high-side power transistors 21, 22 and 23 serving as first drive power transistors are connected commonly to the positive terminal of the DC power source 5 via a current detecting part 51, and the power supply terminals of the three-phase windings 11, 12 and 13 are connected to the current outflow terminals of the high-side power transistors 21, 22 and 23, respectively. In addition, the current outflow terminals of three low-side power transistors 25, 26 and 27 serving as second drive power transistors are connected commonly to the negative terminal of the DC power source 5, and the power supply terminals of the three-phase windings 11, 12 and 13 are connected to the current inflow terminals of the low-side power transistors 25, 26 and 27 serving as second drive power transistors, respectively. Moreover, high-side power diodes 21d, 22d and 23d are connected reversely in parallel with the high-side power transistors 21, 22 and 23, respectively, and low-side power diodes 25d, 26d and 27d are connected reversely in parallel with the low-side power transistors 25, 26 and 27, respectively. Moreover, the high-side power transistors 21, 22 and 23 and the low-side power transistors 25, 26 and 27 are each formed of an N-channel field-effect power transistor, and parasitic diodes, formed by reverse parallel connections to the respective N-channel field-effect power transistors, are respectively used as the high-side power diodes 21d, 22d and 23d and the low-side power diodes 25d, 26d and 27d.

The power supplying part 20 comprises the high-side power transistors 21, 22 and 23, the low-side power transistors 25, 26 and 27, the high-side power diodes 21d, 22d and 23d, and the low-side power diodes 25d, 26d and 27d. The high-side power transistors 21, 22 and 23 open/close the power supply paths between the positive terminal of the DC power source 5 and the power supply terminals of the three-phase windings 11, 12 and 13 in response to the high-side activation control signals N1, N2 and N3 from an activation controlling part 60, thereby forming current paths for supplying the positive currents of the drive currents I1, I2 and I3 to the three-phase windings 11, 12 and 13. The high-side activation control signals N1, N2 and N3 are digital PWM signals in each activation period by virtue of the PWM signal. Wp of a switching controlling part 52. In other words, the high-side power transistors 21, 22 and 23 carry out high-frequency switching operation. The low-side power transistors 25, 26 and 27 open/close the power supply paths between the negative terminal of the DC power source 5 and the power supply terminals of the three-phase windings 11, 12 and 13 in response to the low-side activation control signals M1, M2 and M3 of the activation controlling part 60, thereby forming current paths for supplying the negative currents of the drive currents I1, I2 and I3 to the three-phase windings 11, 12 and 13. The details of the configuration and operation of the switching controlling part 52 will be described later.

Figure 2:
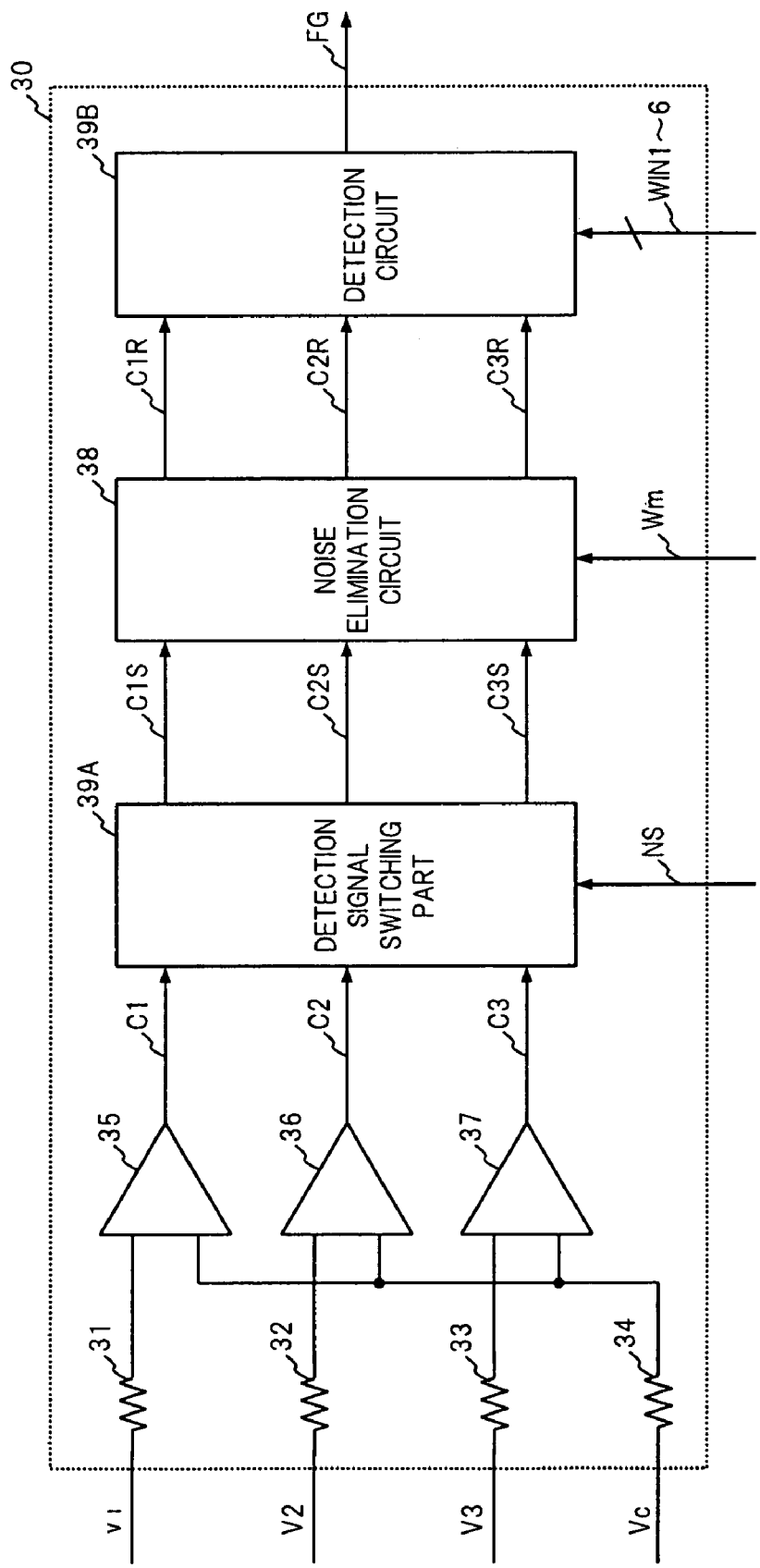
FIG. 2 is a block diagram showing a configuration of a position detecting part 30 of the motor in accordance with Embodiment 1.

A position detecting part 30 detects the rotation position of the disk 1 and the rotor 10, and outputs a position detection pulse signal FG in response to the result of the detection. FIG. 2 shows a specific configuration of the position detecting part 30. The position detecting part 30 comprises four input resistors 31, 32, 33 and 34, three voltage comparison circuits 35, 36 and 37, a detection signal switching circuit 39A, a noise elimination circuit 38 and a detection circuit 39B.

The terminal voltages V1, V2 and V3, each generated at one terminal of each of the three-phase windings 11, 12 and 13, and the voltage Vc at the neutral point wherein the windings are connected commonly are input to the voltage comparison circuits 35, 36 and 37 via the input resistors 31, 32, 33 and 34, respectively. The respective voltage comparison circuits 35, 36 and 37 directly compare the respective terminal voltages V1, V2 and V3 with the voltage Vc at the neutral point, and then respectively output voltage comparison signals C1, C2 and C3 in response to the result of the comparison. The detection signal switching circuit 39A selects the voltage comparison signals C1, C2 and C3 from the voltage comparison circuits 35, 36 and 37 or signals obtained by logically inverting them, and outputs switching signals C1S, C2S and C3S. The details of the configuration and operation of the detection signal switching circuit 39A will be described later. A state judgment signal NS, the output signal of a detection signal switching part 70, is used for switching the detection signal in the position detecting part 30. The detection signal switching part 70 judges the state of the disk 1 and the rotor 10 by using the position detection pulse signal FG, and outputs the state judgment signal NS indicating the state of the disk 1 and the rotor 10.

Figure 3:
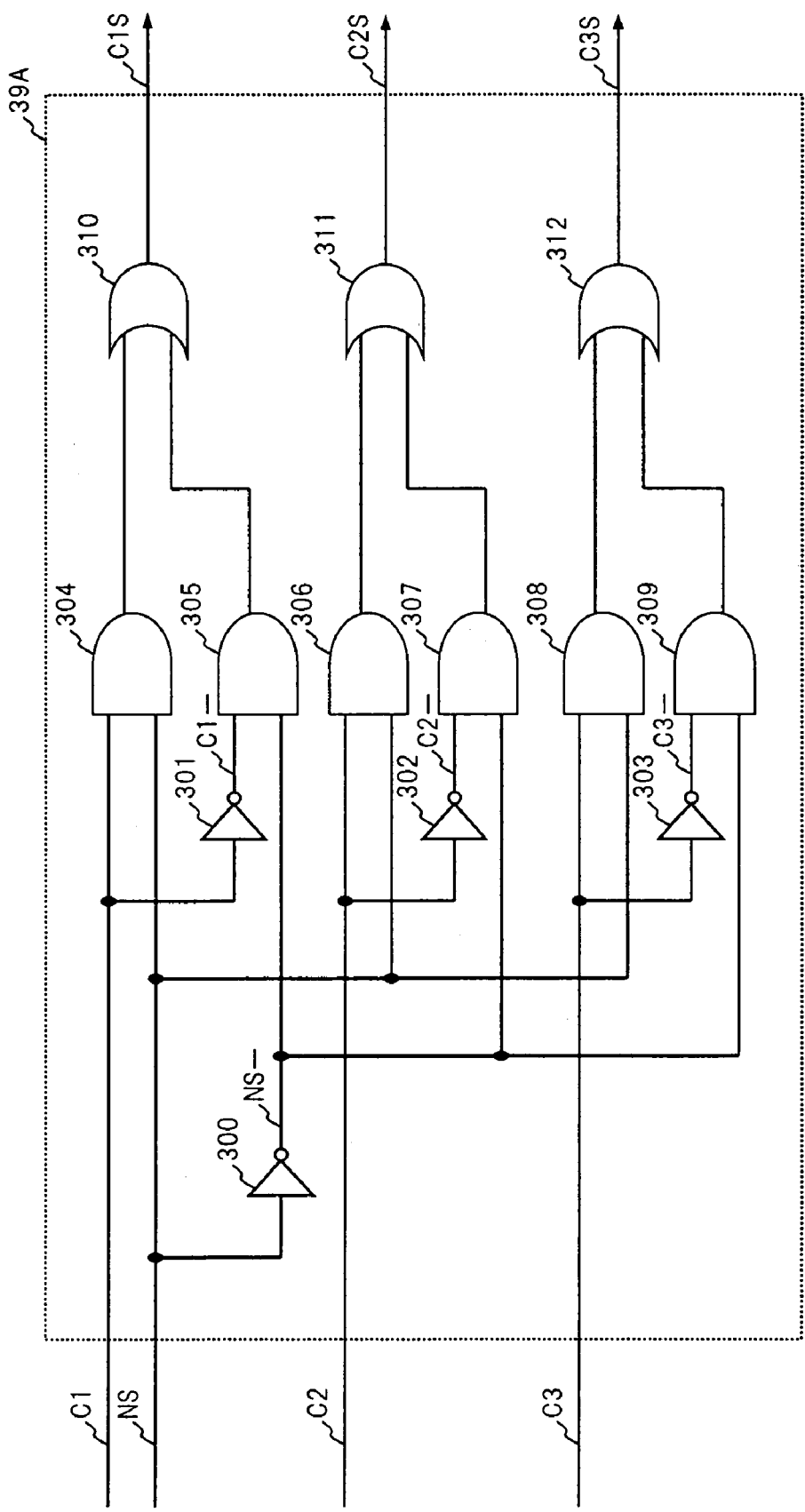
FIG. 3 is a circuit diagram showing a configuration of a detection signal switching circuit 39A of the motor in accordance with Embodiment 1.

A specific circuit configuration of the detection signal switching circuit 39A will be described below by using FIG. 3. FIG. 3 is a circuit diagram showing a specific configuration of the detection signal switching circuit 39A.

The detection signal switching circuit 39A generates voltage comparison inversion signals C1-, C2- and C3- via inverter circuits 301, 302 and 303 from the voltage comparison signals C1, C2 and C3 in response to the result of the comparison. In addition, a state judgment inversion signal NS- is generated from the state judgment signal NS via an inverter circuit 300.

Next, the state judgment signal NS and the voltage comparison signals C1, C2 and C3 or the state judgment inversion signal NS- and the voltage comparison inversion signals C1-, C2- and C3- are respectively input to AND gate circuits 304, 305, 306, 307, 308 and 309, and then AND operations are carried out. The signals from the AND gate circuits 304, 305, 306, 307, 308 and 309 are output to predetermined OR gate circuits 310, 311 and 312. At the respective OR gate circuits 310, 311 and 312, the outputs of the respective two AND gate circuits, 304 and 305, 306 and 307, 308 and 309, are ORed. The three outputs formed by the OR operations at the OR gate circuits 310, 311 and 312 are input to the noise elimination circuit 38 as switching signals C1S, C2S and C3S.

The noise elimination circuit 38 eliminates switching noise caused by the high-frequency switching operation and included in the switching signals C1S, C2S and C3S of the detection signal switching circuit 39A, and outputs noise-eliminated voltage comparison signals C1R, C2R and C3R. The mask signal Wm of the switching controlling part 52 is used for noise elimination. The mask signal Wm will be described later.

Next, the detection circuit 39B of the position detecting part 30 receives the noise-eliminated voltage comparison signals C1R, C2R and C3R of the noise elimination circuit 38 and the detection window signals WIN1 to 6 of the activation controlling part 60, and outputs only the position detection pulse signal FG for detecting the position of the disk 1 and the rotor 10. In other words, the detection circuit 39B outputs the position detection pulse signal FG in response to the result of the position detection of the disk 1 and the rotor 10. The position detection pulse signal FG is input to a commanding part 40, the activation controlling part 60 and the detection signal switching part 70.

Figure 5:
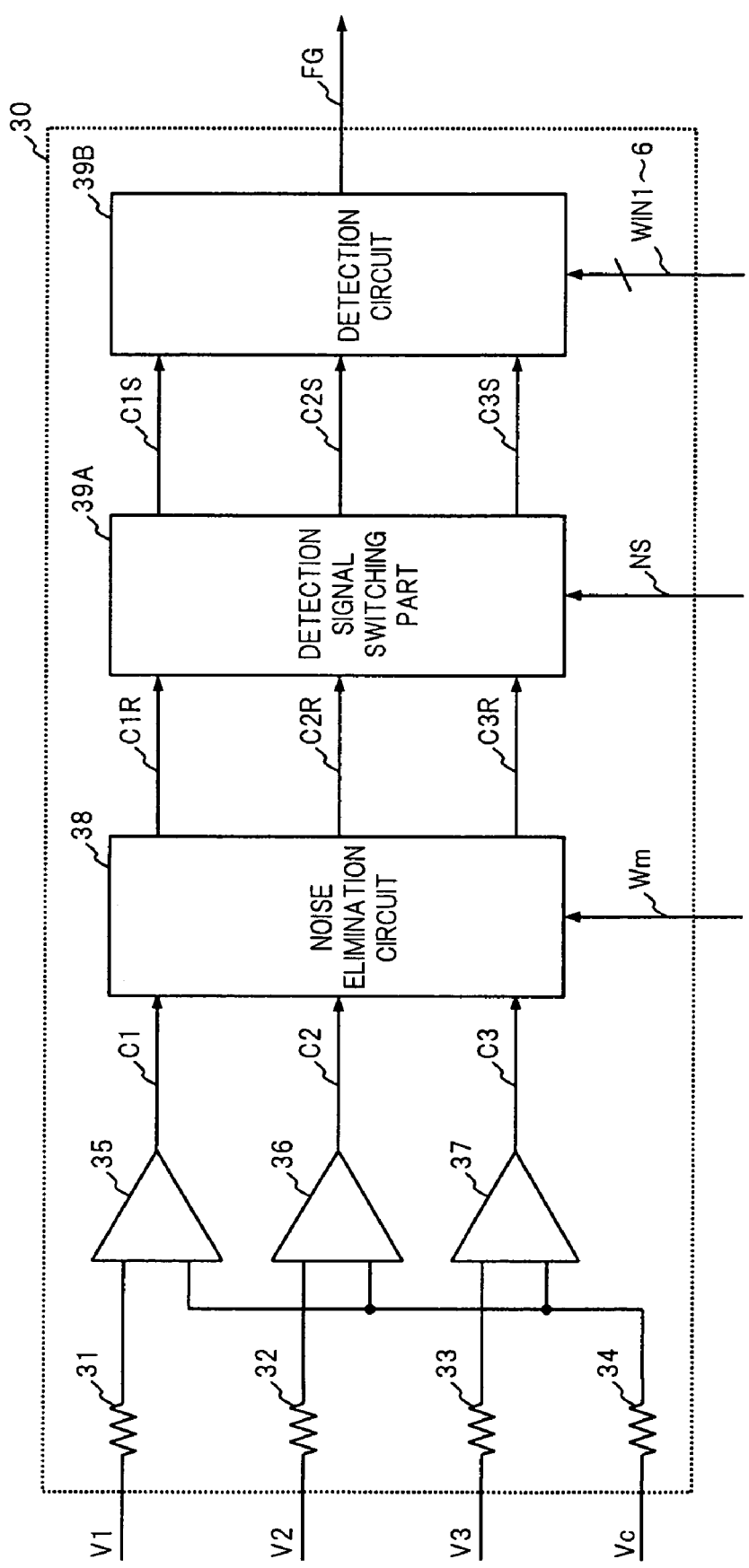
FIG. 5 is a block diagram showing another configuration of a position detecting part 30 of the motor in accordance with Embodiment 1.

In the configuration of the position detecting part 30, as shown in FIG. 5, the circuit arrangement of the noise elimination circuit 38 and the detection signal switching circuit 39A may be reversed. Even in this configuration wherein the circuit arrangement of the noise elimination circuit 38 and the detection signal switching circuit 39A are reversed, the respective circuits of the position detecting part 30 carry out the same operations as those of the respective circuits of the position detecting part 30 described previously and has substantially similar effects.

The detection window signals WIN1 to 6 input to the detection circuit 39B of the position detecting part 30 will be described below.

The detection window signals WIN1 to 6 are the output signals of the activation controlling part 60 and correspond windows for detecting the rising and falling zero-crossing of the counter electromotive voltages induced in the three-phase windings 11, 12 and 13 in non-activation phases, respectively. For example, the detection window signal WIN1 is a window for detecting the rising zero-crossing of the counter electromotive voltage of the winding 11, the detection window signal WIN2 is a window for detecting the falling zero-crossing of the counter electromotive voltage of the winding 13, and the detection window signal WIN3 is a window for detecting the rising zero-crossing of the counter electromotive voltage of the winding 12. In this way, the detection window signals WIN1 to 6 are displaced from one another by an electrical angle of 60 degrees.

The commanding part 40 comprises a speed control circuit for controlling the rotation speed of the disk 1 and the rotor 10 at a predetermined speed, detects the rotation speed of the disk 1 and the rotor 10 by using the position detection pulse signal FG from the position detecting part 30, and outputs a speed command signal Ac to the switching controlling part 52 in response to the difference from a target rotation speed.

Figure 4:
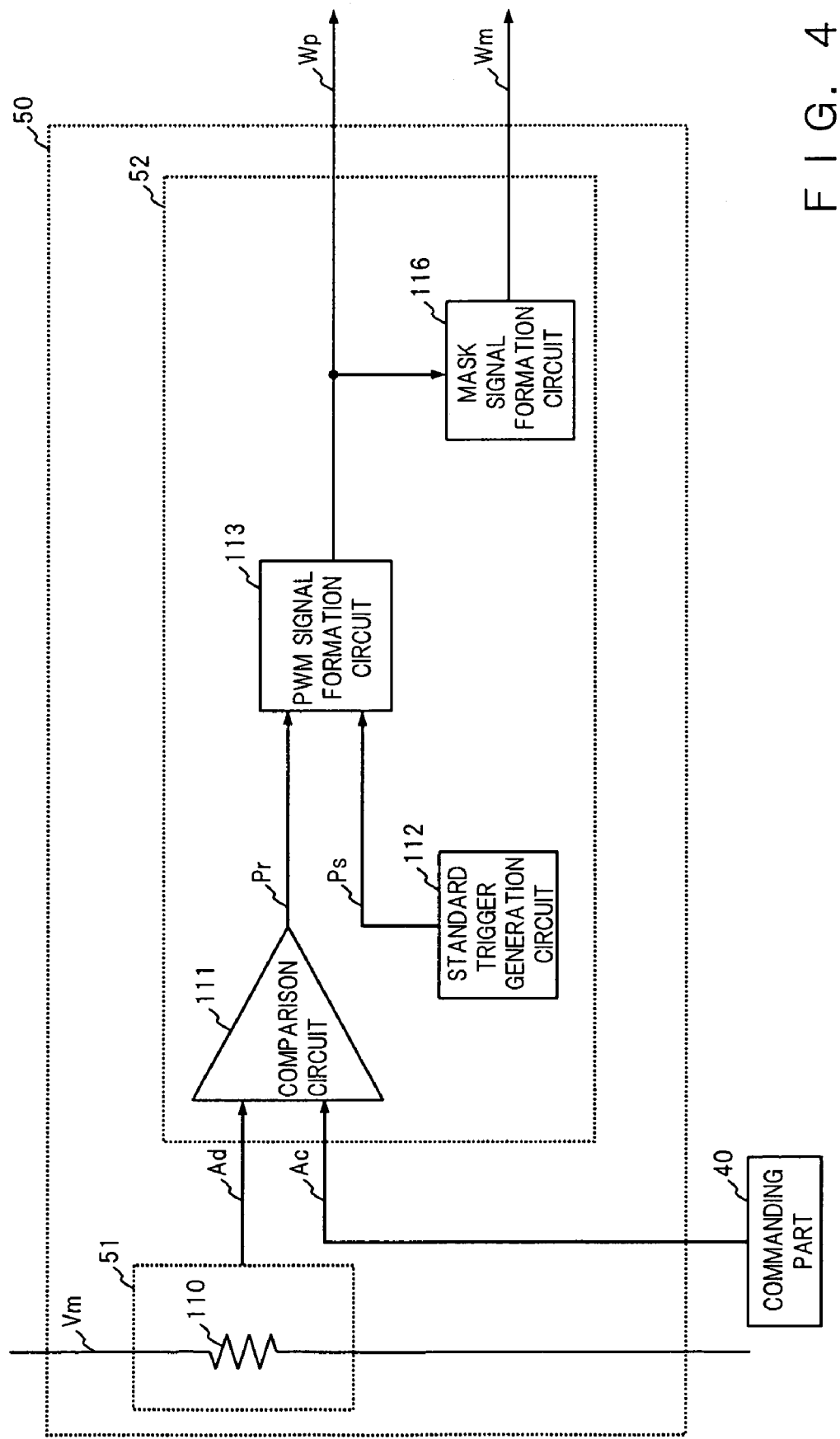
FIG. 4 is a block diagram showing a configuration of a switching operating part 50 of the motor in accordance with Embodiment 1.

As shown in FIG. 1, a switching operating part 50 comprises the current detecting part 51 and the switching controlling part 52. FIG. 4 is a block diagram showing a specific configuration of the switching operating part 50. The current detecting part 51 comprises a current detection resistor 110, and outputs a current detection signal Ad proportionate to the activation current Vm or the supply current that is supplied from the positive terminal of the DC power source 5 to the three-phase windings 11, 12 and 13 via the high-side power transistors 21, 22 and 23. The switching controlling part 52 compares the current detection signal Ad of the current detecting part 51 with the speed command signal Ac from the commanding part 40, forms a PWM reset signal Pr in response to the result of the comparison, and outputs a PWM signal Wp and a mask signal Wm in response to the PWM reset signal Pr. The PWM signal Wp is input to the activation controlling part 60, and the mask signal Wm is input to the noise elimination circuit 38 of the position detecting part 30. The PWM signal Wp is a signal for causing the high-side power transistors 21, 22 and 23 and the low-side power transistors 25, 26 and 27 of the power supplying part 20 to perform high-frequency switching operation (PWM operation).

In the motor in accordance with Embodiment 1, the current detecting part 51 is provided between the positive terminal of the DC power source 5 and the high-side power transistors 21, 22 and 23; however, even if it is provided between the negative terminal of the DC power source 5 and the low-side power transistors 25, 26 and 27, a similar effect is obtained.

Figure 6:
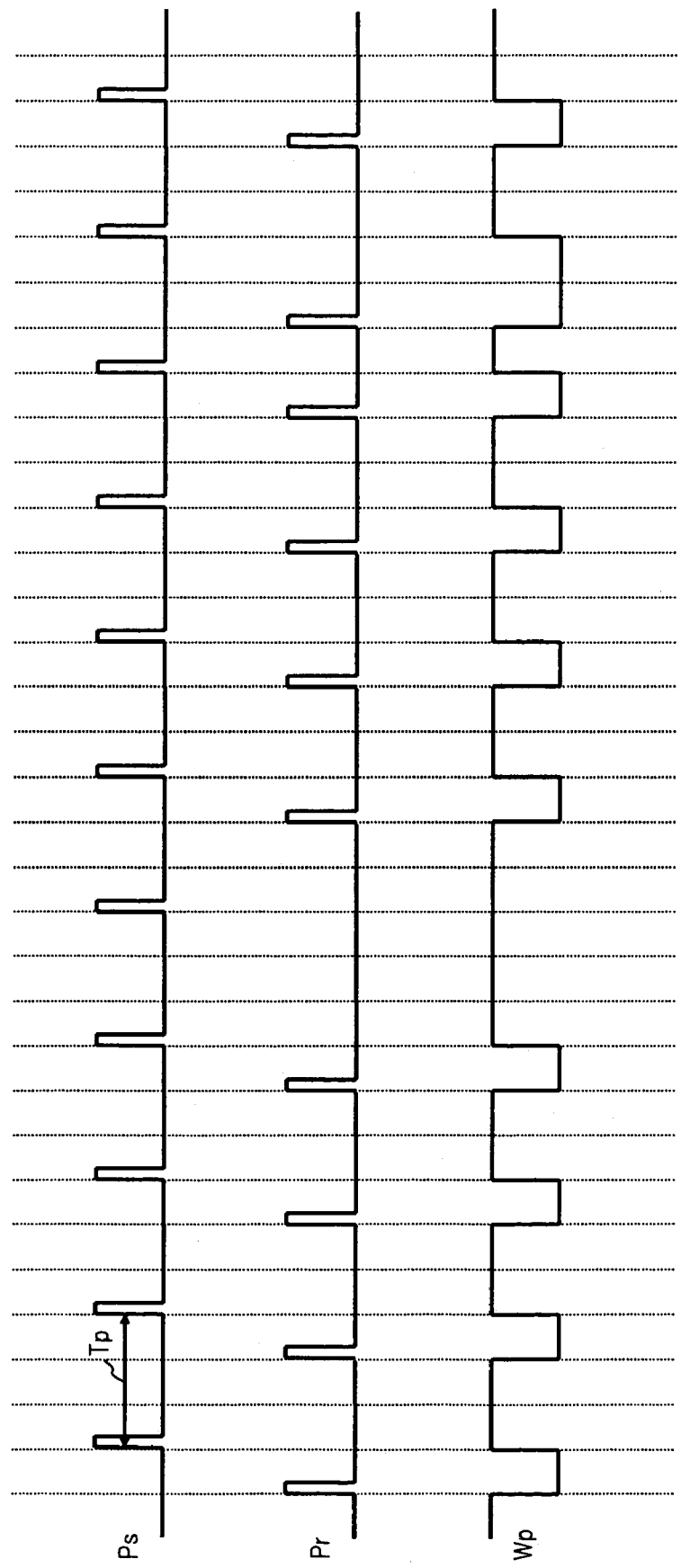
FIG. 6 is a timing diagram showing a motion of each section of a switching operating part 50 of the motor in accordance with Embodiment 1.

As shown in FIG. 4, the switching controlling part 52 comprises a comparison circuit 111, a standard trigger generation circuit 112, a PWM signal formation circuit 113 and a mask signal formation circuit 116. The comparison circuit 111 compares the current detection signal Ad of the current detecting part 51 with the speed command signal Ac of the commanding part 40, and outputs the PWM reset signal Pr in response to the result of the comparison. More specifically, when the current detection signal Ad becomes larger than the speed command signal Ac, the state of the PWM reset signal Pr changes from the "L" level to the "H" level. The standard trigger generation circuit 112 is a circuit for outputting a standard trigger signal Ps in a constant cycle Tp. Specifically, its frequency 1/Tp has a value of 20 kHz to 500 kHz. The PWM signal formation circuit 113 outputs the PWM signal Wp by using the PWM reset signal Pr of the comparison circuit 111 and the standard trigger signal Ps of the standard trigger generation circuit 112. FIG. 6 shows the relationship among the standard trigger signal Ps, the PWM reset signal Pr and the PWM signal Wp. The state of the PWM signal Wp changes to the "H" level at the rising edge of the standard trigger signal Ps having the constant cycle Tp, and changes to the "L" level at the rising edge of the PWM reset signal Pr. In this way, the PWM signal Wp becomes a PWM signal in response to the result of the comparison between the current detection signal Ad and the speed command signal Ac. In other words, the basic PWM signal Wb is a PWM signal, the duty of which is changed in response to the speed command signal Ac from the commanding part 40. More specifically, in the case when the actual rotation speed of the disk 1 and the rotor 10 is lower than the target rotation speed, the speed command signal Ac of the commanding part 40 becomes larger, and the ON duty of the PWM signal Wp also becomes larger. Conversely, in the case when the actual rotation speed of the disk 1 and the rotor 10 is higher than the target rotation speed, the speed command signal Ac of the commanding part 40 becomes smaller, and the ON duty of the PWM signal Wp also becomes smaller. Furthermore, in the case when the actual rotation speed of the disk 1 and the rotor 10 is nearly equal to the target rotation speed, the speed command signal Ac of the commanding part 40 has a value corresponding to the target rotation speed, and the ON duty of the PWM signal Wp also has a value nearly corresponding to the target rotation speed.

As described above, in the motor in accordance with Embodiment 1, the commanding part 40 detects the rotation speed of the disk 1 and the rotor 10 from the position detection pulse signal FG of the position detecting part 30, and outputs the speed command signal Ac in response to the difference from the target rotation speed. Furthermore, in the motor in accordance with Embodiment 1, the speed of the disk 1 and the rotor 10 is controlled by changing the ON duty of the PWM signal Wp in response to the speed command signal Ac.

The activation controlling part 60 outputs the high-side activation control signals N1, N2 and N3 and the low-side activation control signals M1, M2 and M3 in response to the position detection pulse signal FG of the position detecting part 30, thereby controlling the high-side power transistors 21, 22 and 23 and the low-side power transistors 25, 26 and 27 for activation to the three-phase windings 11, 12 and 13. The PWM signal Wp of the switching controlling part 52 is logically synthesized in the high-side activation control signals N1, N2 and N3. By using the high-side activation control signals N1, N2 and N3 (the PWM signal Wp), the high-side power transistors 21, 22 and 23 carry out high-frequency switching operation (PWM operation); and by using the low-side activation control signals M1, M2 and M3, the low-side power transistors 25, 26 and 27 carry out full-ON operation.

More specifically, in the case when activation control is carried out from the winding 11 to the winding 12, the high-side power transistor 21 carries out high-frequency switching operation (PWM operation) by using the high-side activation control signal N1 (PWM signal Wp), and the low-side power transistor 26 carries out full-ON operation by using the low-side activation control signal M2. When the high-side power transistor 21 is turned ON by the PWM signal Wp, the high-side power transistor 21 supplies the positive current from the positive terminal of the DC power source 5 to the winding 11, and the low-side power transistor 26 supplies the negative current from the negative terminal of the DC power source 5 to the winding 12. Next, when the PWM signal Wp turns OFF, the positive current flowing in the winding 11 tends to flow continuously by the action of the inductance of the winding 12, thereby supplying the positive current to the winding 11 via the low-side power diode 25*d* of the same phase.

In the motor in accordance with Embodiment 1, PWM sensorless driving is carried out as described above. In addition, as described before, the activation controlling part 60 outputs the detection window signals WIN1 to 6 in response to the position detection pulse signal FG of the position detecting part 30.

Generally, in the sensorless driving of the conventional motor, it is necessary to detect the rotation position of the disk 1 and the rotor 10; hence, a non-activation period, that is, a period wherein the high-side and low-side power transistors of the same phase in the power supplying part 20 are OFF, is provided, the zero-crossing of the counter electromotive voltage induced in the corresponding winding is detected in the period, whereby the sensorless driving of the motor is carried out. However, since the position of the rotor is indefinite and the rotation speed thereof is low at the beginning of starting, the counter electromotive voltages induced in the three-phase windings 11, 12 and 13 are small, and position detection is difficult. Hence, in the sensorless driving of the conventional motor, a starting failure may occur, resulting in a problem. In particular, in the case when the motor is driven by PWM operation, an induced voltage owing to the change in current due to PWM operation is superimposed on the terminal voltage of a detection phase; in the case when the conventional motor is started by PWM sensorless operation, the position is detected erroneously under the influence of the induced voltage, whereby a starting failure may occur. In this way, the induced voltage is generated owing to the change in current due to PWM operation; in particular, at the beginning of starting, the induced voltage significantly affects position detection.

The induced voltage generated during the PWM sensorless starting of the motor will be described below. The induced voltage is herein defined as a voltage generated owing to the change in current due to PWM operation. This induced voltage is described specifically by using the motor in accordance with Embodiment 1; in the power supplying part 20 of FIG. 1, the high-side power transistor 21 is subjected to PWM operation, and the low-side power transistor 27 is subjected to full-ON operation. This operation state is the state of activation from the winding 11 to the winding 13, and the detection phase is the winding 12. In the case when the motor is not rotated, the voltage Vc at the neutral point, the common connection point, is usually equal to the terminal voltage V2 of the detection phase (the winding 12), and the voltage difference therebetween should be zero. However, when the motor is subjected to PWM operation, an induced voltage generated as a phenomenon peculiar to PWM operation is superimposed on the terminal voltage V2 of the detection phase in comparison with the voltage Vc at the neutral point. The induced voltage is a voltage generated owing to the change in current due to PWM operation, and its characteristic becomes opposite in polarity depending on whether the amount of current change is positive or negative. In addition, the magnitude of the induced voltage changes depending on the amount of current change.

As a method of starting the disk and the rotor in the conventional motor, a method wherein the disk and the rotor are attracted to a specific phase so as to be fixed in position before starting and then started is available. When starting is carried out after initial position fixture is carried out in this way, stable sensorless starting is possible; however, the time required for the initial position fixture becomes long; hence, in the conventional motor, a starting method wherein forced synchronous driving is carried out at the beginning of starting and then switched to sensorless driving has been used frequently.

In the configuration wherein the peak values of the drive currents of the three-phase windings 11, 12 and 13 are controlled by the current detecting part 51, just as in the case of the motor in accordance with Embodiment 1 of the present invention, the ON duty of PWM immediately after the beginning of starting is large, almost 100%. In other words, immediately after the beginning of starting, position detection is carried out almost in the ON period of the PWM operation. In this case, the induced voltage owing to the positive change in current due to PWM operation is superimposed on the terminal voltage of the detection phase; under the influence thereof, the position is detected erroneously, thereby being in danger of causing a starting failure.

Hence, the motor in accordance with Embodiment 1 is configured so that position detection is carried out in the ON period of the PWM operation at times except the beginning of starting and so that an inversion detection signal obtained by inverting the logic of the signal detected as the position signal is used at the beginning of starting. More specifically, the position detecting part 30 is provided with the detection signal switching circuit 39A, and the inversion detection signal is output from the detection signal switching circuit 39A at the beginning of starting, and position detection is carried out only in the ON period in the position detecting part 30. With this configuration, the position detection operation is carried out only in the ON period, and the detection signal is logically inverted at the beginning of starting and used as the position signal, whereby position detection at the time of the negative change in current due to PWM operation is carried out artificially. Hence, the characteristic of the induced voltage at this time is opposite in polarity to that of the induced voltage owing to the positive change in current due to PWM operation, wherein a starting failure is caused. With this configuration, the motor in accordance with Embodiment 1 can carry out stable PWM sensorless starting. Furthermore, stable PWM sensorless operation is made possible by switching the position signal from the inversion detection signal to the detection signal after the beginning of starting in response to the state judgment signal NS.

In the PWM sensorless driving control of the motor in accordance with Embodiment 1 of the present invention, when it is assumed that the ON period is A and that a first predetermined time after ON is Ta, the ON period A may have any time, provided that it is longer than the first predetermined time Ta (A>Ta). The configuration of the motor in accordance with Embodiment 1 can be modified variously without departing from the spirit of the present invention, and it is needless to say that such configurations are included in the scope of the present invention.

In the motor in accordance with Embodiment 1, the power supplying part 20 is power supplying part means, the position detecting part 30 is position detecting means, the commanding part 40 is commanding means, and the switching operating part 50 is switching operating means. In addition, the activation controlling part 60 is activation controlling means, the detection signal switching circuit 39A is position detection signal switching means, and the detection signal switching part 70 is state judging means.

Embodiment 2

Figure 7:
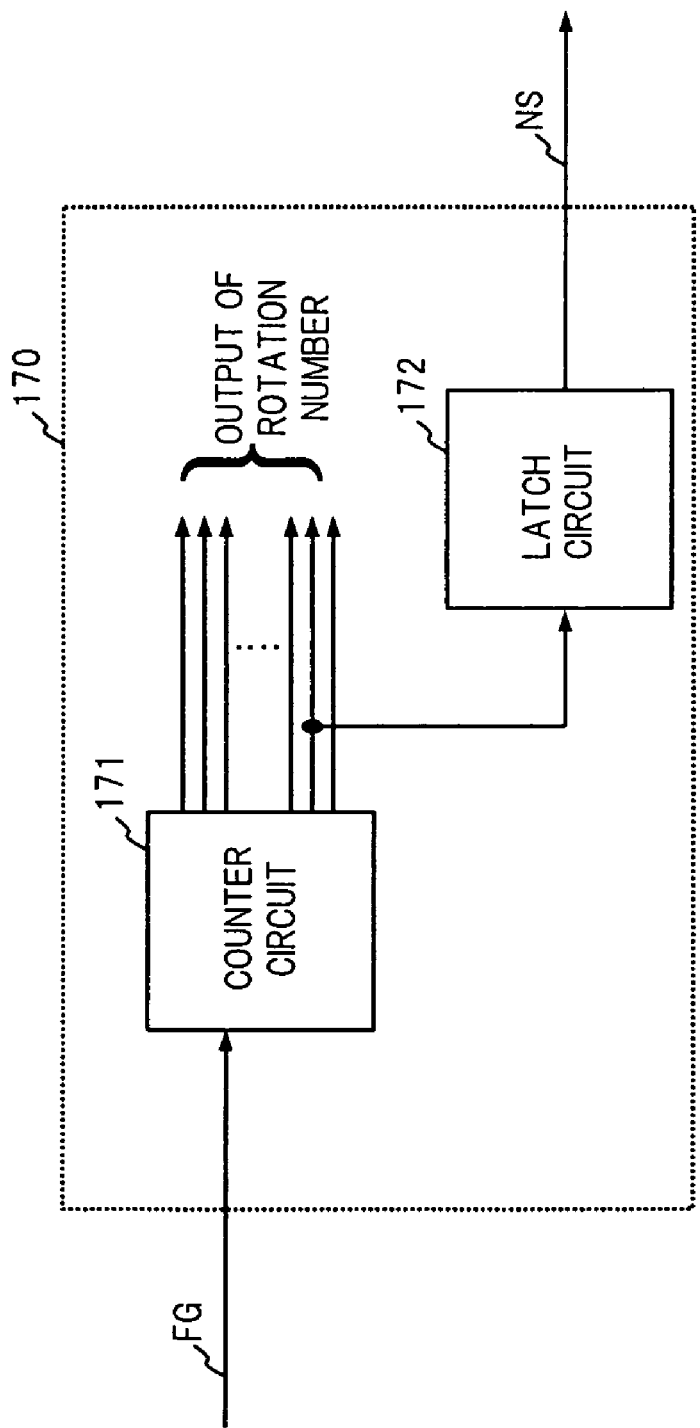
FIG. 7 is a block diagram showing a configuration of a detection signal switching part 170 of a motor in accordance with Embodiment 2 of the present invention.

A motor in accordance with Embodiment 2 of the present invention will be described below. The motor in accordance with Embodiment 2 has substantially the same configuration as that of the above-mentioned Embodiment 1, and Embodiment 2 discloses a specific configuration of the detection signal switching part serving as state judging means in the motor. FIG. 7 is a block diagram showing the configuration of the detection signal switching part in the motor in accordance with Embodiment 2. In the explanations of Embodiment 2, the components having the same functions and configurations as those of Embodiment 1 are designated by the same numerals, and their explanations are omitted.

A detection signal switching part 170 serving as state judging means in the motor in accordance with Embodiment 2 will be described referring to FIG. 7. The detection signal switching part 170 comprises a counter circuit 171 and a latch circuit 172. The position detection pulse signal FG is input to the counter circuit 171, and the rotation speed data of the disk 1 and the rotor 10 are output sequentially in response to this position detection pulse signal FG. Next, when the output of the rotation speed data indicating a predetermined rotation speed (rotation number) in the rotation speed data is input to the latch circuit 172 at least once, the latch circuit 172 outputs the state judgment signal NS.

Since the detection signal switching part 170 is configured as described above, in the motor in accordance with Embodiment 2, the switching of the position signal in an incorrect state owing to the malfunction or the like of the detection signal switching part 170 can be prevented securely, whereby stable PWM sensorless starting is possible. In addition, in the motor in accordance with Embodiment 2, stable PWM sensorless operation is made possible by switching the position signal from the inversion detection signal to the detection signal in response to the state judgment signal NS.

The configuration of the motor in accordance with Embodiment 2 is not limited to the configuration wherein the state of the disk 1 and the rotor 10 is judged by using the position detection pulse signal FG; other configurations may be used to judge the state of the disk 1 and the rotor 10.

The motor in accordance with the above-mentioned Embodiment 2 is configured so that the latch circuit 172 outputs the state judgment signal NS by using the predetermined rotation speed (rotation number) in the rotation speed data; hence, it is effective that this rotation speed is set at a rotation number wherein the maximum value of the counter electromotive voltage of the rotor becomes larger than the maximum generation voltage caused by the mutual inductance.

Embodiment 3

Figure 8:
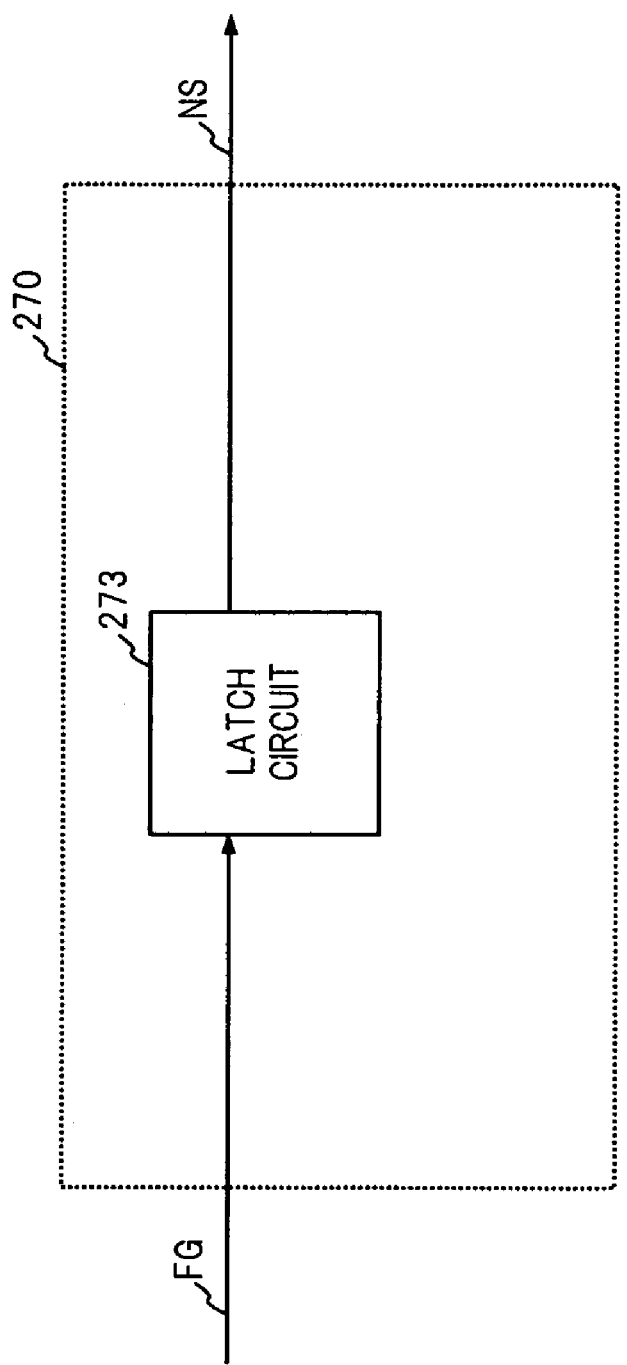
FIG. 8 is a block diagram showing another configuration of a detection signal switching part 270 of a motor in accordance with Embodiment 3 of the present invention.

A motor in accordance with Embodiment 3 of the present invention will be described below. FIG. 8 is a block diagram showing the configuration of a detection signal switching part serving as state judging means in the motor in accordance with Embodiment 3. The configuration of the motor in accordance with Embodiment 3 is substantially the same as that of the motor in accordance with the above-mentioned Embodiment 1, except for the detection signal switching part 70, and a detection signal switching part 270, shown in FIG. 8, is provided instead of the detection signal switching part 70. Hence, in the explanations of Embodiment 3, the components having the same functions and configurations as those of Embodiment 1 are designated by the same numerals, and their explanations are omitted.

The detection signal switching part 270 serving as state judging means in the motor in accordance with Embodiment 3 will be described by using FIG. 8.

As shown in FIG. 8, the detection signal switching part 270 is provided with a latch circuit 273. The position detection pulse signal FG from the position detecting part 30 is input to this latch circuit 273; when the position detection pulse signal FG is input at least once, the state judgment signal NS is output to the position detecting part 30.

In the motor in accordance with Embodiment 3, after stable PWM sensorless starting is carried out, the position signal is switched from the inversion detection signal to the detection signal in response to the state judgment signal NS not dependent on the rotation speed of the disk 1 and the rotor 10 by using the detection signal switching part 270. Hence, the motor in accordance with Embodiment 3 can carry out stable PWM sensorless operation.

Embodiment 4

Figure 9:
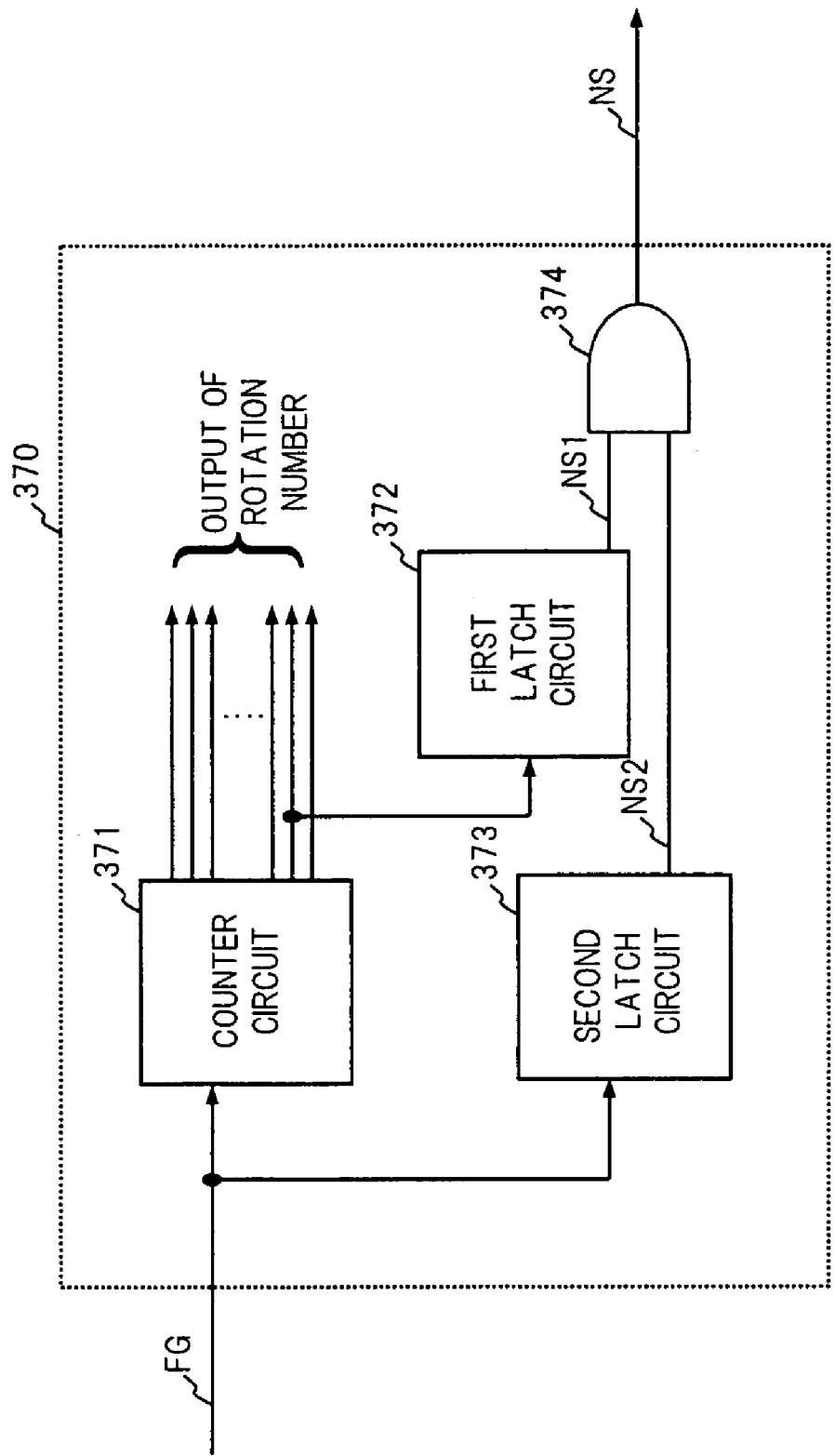
FIG. 9 is a block diagram showing another configuration of a detection signal switching part 370 of a motor in accordance with Embodiment 4 of the present invention.

A motor in accordance with Embodiment 4 of the present invention will be described below. FIG. 9 is a block diagram showing the configuration of a detection signal switching part serving as state judging means in the motor in accordance with Embodiment 4. The configuration of the motor in accordance with Embodiment 4 is substantially the same as that of the motor in accordance with the above-mentioned Embodiment 1, except for the detection signal switching part 70, and a detection signal switching part 370, shown in FIG. 9, is provided instead of the detection signal switching part 70. Hence, in the explanations of Embodiment 4, the components having the same functions and configurations as those of Embodiment 1 are designated by the same numerals, and their explanations are omitted.

The detection signal switching part 370 serving as state judging means in the motor in accordance with Embodiment 4 will be described by using FIG. 9.

As shown in FIG. 9, the detection signal switching part 370 is provided with a counter circuit 371, a first latch circuit 372, a second latch circuit 373 and an AND gate circuit 374. The position detection pulse signal FG is input from the position detecting part 30 to the counter circuit 371 and the second latch circuit 373. When a signal indicating a predetermined rotation speed (rotation number) in the rotation speed data output from the counter circuit 371 is input at least once to the first latch circuit 372, the first latch circuit 372 outputs a first state judgment signal NS1 to the AND gate circuit 374. When the position detection pulse signal FG is input at least once from the position detecting part 30, the second latch circuit 373 outputs a second state judgment signal NS2 to the AND gate circuit 374. The AND gate circuit 374 receives the first state judgment signal NS1 and the second state judgment signal NS2, carries out an AND operation, and outputs the result as the state judgment signal NS.

In the motor in accordance with Embodiment 4, after stable PWM sensorless starting is securely carried out, the position signal is switched from the inversion detection signal to the detection signal in response to the state judgment signal NS not dependent on the rotation speed of the disk 1 and the rotor 10 by using the AND operation of the two latch circuits 372 and 373 of the detection signal switching part 370. Hence, the motor in accordance with Embodiment 4 can securely carry out stable PWM sensorless operation.

Embodiment 5

Figure 10:
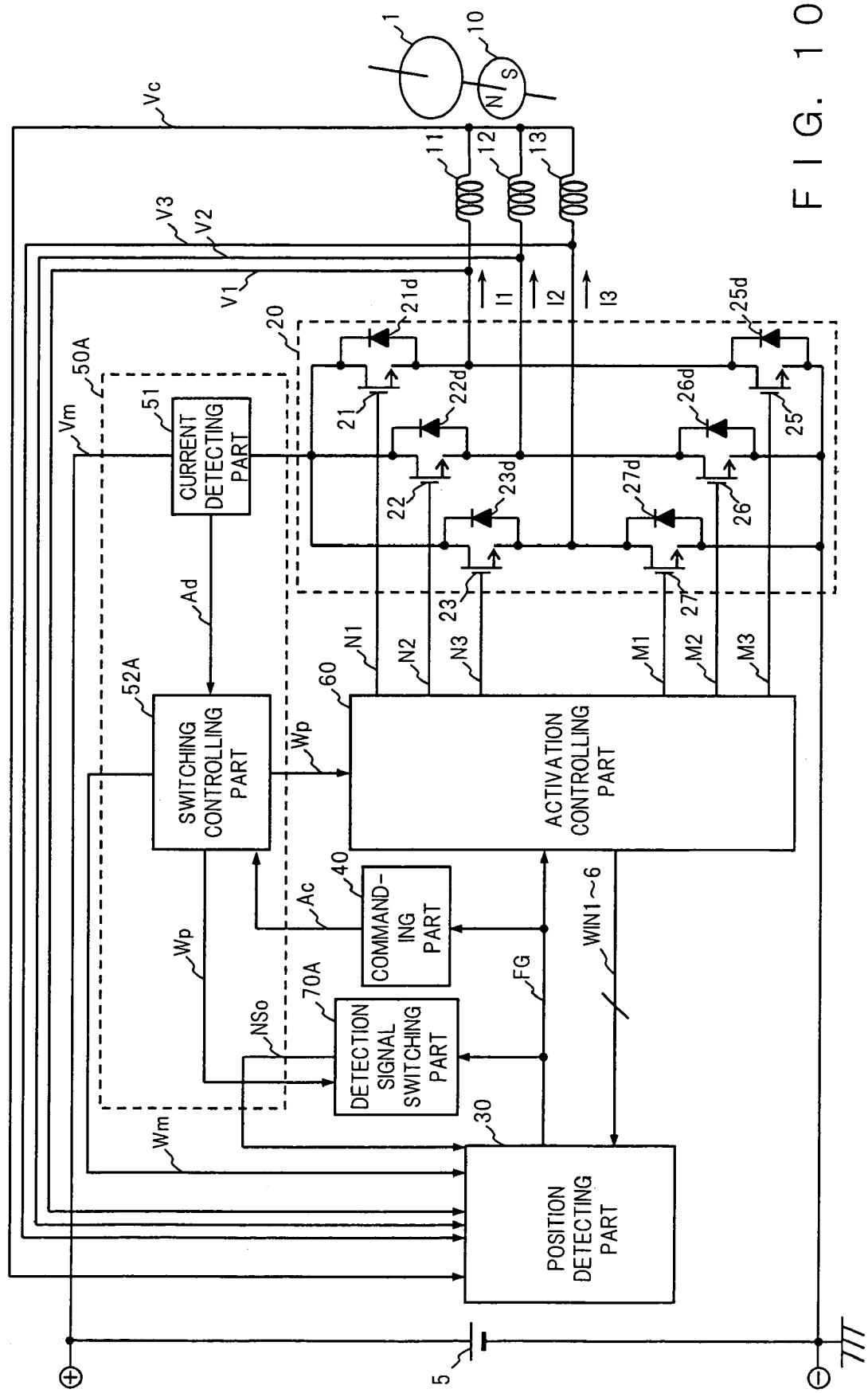
FIG. 10 is a block diagram showing a configuration of a motor in accordance with Embodiment 5 of the present invention.
Figure 11:
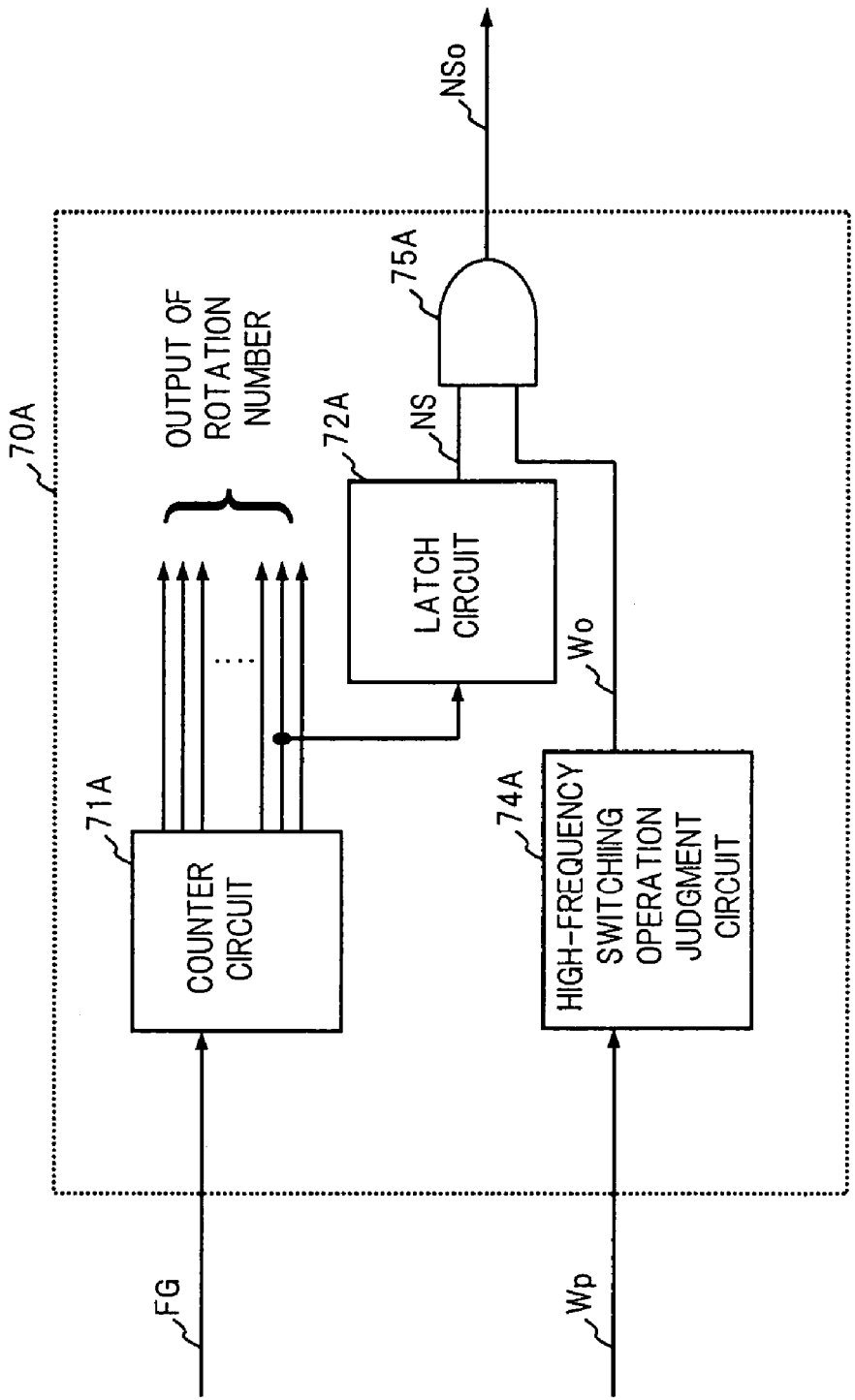
FIG. 11 is a block diagram showing a configuration of a detection signal switching part 70A of the motor in accordance with Embodiment 5.

A motor in accordance with Embodiment 5 of the present invention will be described below. FIG. 10 is a block diagram showing the configuration of the motor in accordance with Embodiment 5. FIG. 11 is a block diagram showing the configuration of a detection signal switching part in the motor in accordance with Embodiment 5. The configuration of the motor in accordance with Embodiment 5 is substantially the same as that of the motor in accordance with the above-mentioned Embodiment 1, except for the switching controlling part 52 and the detection signal switching part 70, and a detection signal switching part 70A, shown in FIG. 11, is provided instead of the detection signal switching part 70. In addition, a switching controlling part 52A in accordance with Embodiment 5, having the configuration of the switching controlling part 52 in accordance with Embodiment 1 shown in FIG. 4, outputs the PWM signal Wp to the activation controlling part 60 and the detection signal switching part 70A, and the PWM operation state judgment signal NSo output from the detection signal switching part 70A is input to the position detecting part 30. In the explanations of Embodiment 5, the components having the same functions and configurations as those of Embodiment 1 are designated by the same numerals, and their explanations are omitted.

As shown in FIG. 11, the detection signal switching part 70A in accordance with Embodiment 5 is provided with a counter circuit 71A, a latch circuit 72A, a high-frequency switching operation judgment circuit 74A and an AND gate circuit 75A. The counter circuit 71A receives the position detection pulse signal FG of the position detecting part 30 and outputs rotation speed data sequentially. When a signal indicating the predetermined rotation speed in the rotation speed data is input at least once, the latch circuit 72A outputs the state judgment signal NS to the AND gate circuit 75A.

When the PWM signal Wp is input from the switching controlling part 52A at least once, the high-frequency switching operation judgment circuit 74A outputs a PWM operation signal Wo, having the "H" level, to the AND gate circuit 75A. Next, the AND gate circuit 75A receives the state judgment signal NS and the PWM operation signal Wo, carries out an AND operation, and outputs the result of the operation as the PWM operation state judgment signal NSo. This PWM operation state judgment signal NSo is input as the output of the detection signal switching part 70A to the position detecting part 30.

In the motor in accordance with Embodiment 5 configured as described above, in the case when high-frequency switching operation is not carried out at the time of PWM sensorless starting, an induced voltage occurring as a phenomenon peculiar to PWM operation is not generated. Hence, in the motor in accordance with Embodiment 5, operation in consideration of an induced voltage occurring as a phenomenon peculiar to PWM operation is stopped in the position detecting part 30. On the other hand, in the case when high-frequency switching operation is carried out at the time of PWM sensorless starting, the operation in consideration of an induced voltage occurring as a phenomenon peculiar to PWM operation is carried out in the position detecting part 30. Hence, the motor in accordance with Embodiment 5 can carry out stable sensorless starting, regardless of whether the high-frequency switching operation is carried out or not.

Furthermore, in the motor in accordance with Embodiment 5, a switching operating part 50A is switching operating means, and the detection signal switching part 70A is state judging means.

Embodiment 6

Figure 12:
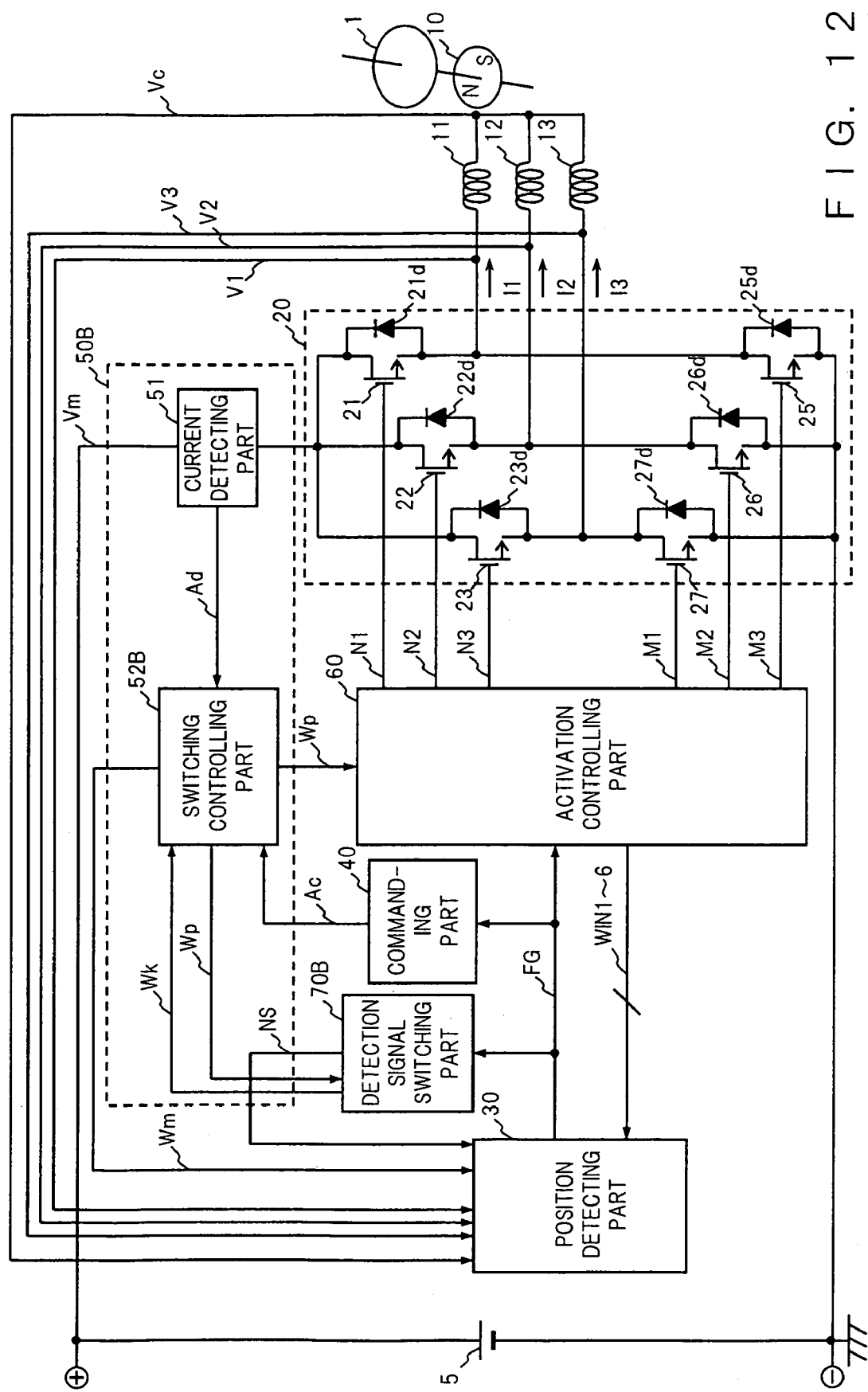
FIG. 12 is a block diagram showing a configuration of a motor in accordance with Embodiment 6 of the present invention.
Figure 13:
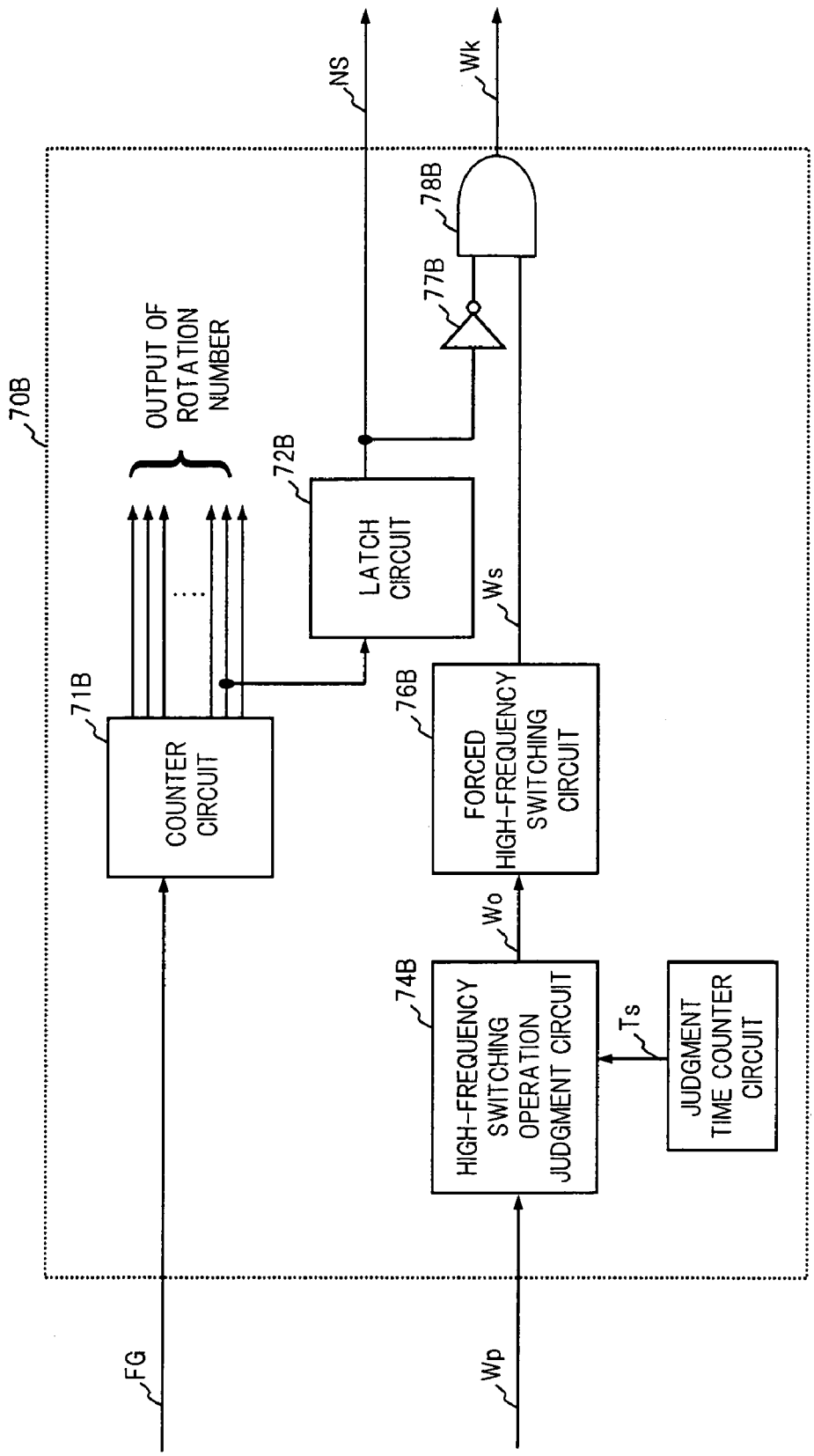
FIG. 13 is a block diagram showing a configuration of a detection signal switching part 70B of the motor in accordance with Embodiment 6.

A motor in accordance with Embodiment 6 of the present invention will be described below. FIG. 12 is a block diagram showing the configuration of the motor in accordance with Embodiment 6. FIG. 13 is a block diagram showing the configuration of a detection signal switching part in the motor in accordance with Embodiment 6. The configuration of the motor in accordance with Embodiment 6 is substantially the same as that of the motor in accordance with the above-mentioned Embodiment 1, except for the switching controlling part 52 and the detection signal switching part 70, and a detection signal switching part 70B, shown in FIG. 13, is provided instead of the detection signal switching part 70. In addition, a switching controlling part 52B in accordance with Embodiment 6, having the configuration of the switching controlling part 52 in accordance with Embodiment 1 shown in FIG. 4, outputs the PWM signal Wp to the activation controlling part 60 and the detection signal switching part 70B. The state judgment signal NS output from the detection signal switching part 70B is input to the position detecting part 30, and a forced switching signal Wk output from the detection signal switching part 70B is input to the PWM signal formation circuit 113 (see FIG. 4) of the switching controlling part 52B. In the explanations of Embodiment 6, the components having the same functions and configurations as those of Embodiment 1 are designated by the same numerals, and their explanations are omitted.

The detection signal switching part 70B of the motor in accordance with Embodiment 6 is provided with a counter circuit 71B, a latch circuit 72B, a high-frequency switching operation judgment circuit 74B, a forced high-frequency switching circuit 76B, an inverter circuit 77B and an AND gate circuit 78B. The counter circuit 71B receives the position detection pulse signal FG from the position detecting part 30 and outputs rotation speed data sequentially. When a signal indicating a predetermined rotation speed in the rotation speed data is input at least once, the latch circuit 72B outputs the state judgment signal NS. This state judgment signal NS becomes the output of the detection signal switching part 70B at the time of ordinary switching operation not affected by an induced voltage.

On the other hand, when the PWM signal Wp is not input at least once from the switching controlling part 52B to the high-frequency switching operation judgment circuit 74B during a first predetermined time Ts, the high-frequency switching operation judgment circuit 74B holds the PWM operation signal Wo at the "H" level and outputs the signal to the forced high-frequency switching circuit 76B. Next, when the PWM operation signal Wp is input at least once during the first predetermined time Ts, the high-frequency switching operation judgment circuit 74B outputs the PWM operation signal Wo having the "L" level to the forced high-frequency switching circuit 76B. When the PWM operation signal Wo having the "H" level is input to the forced high-frequency switching circuit 76B, the forced high-frequency switching circuit 76B outputs a signal wherein the "H" level and the "L" level are repeated in a constant cycle Tp as a forced switching signal Ws to the AND gate circuit 78B. A signal indicating the first predetermined time Ts is counted by a judgment time counter circuit at the time of the beginning of starting, and the output signal (Ts) thereof is input to the high-frequency switching operation judgment circuit 74B.

The signal obtained when the state judgment signal Ns is converted by the inverter circuit 77B and the forced switching signal Ws are input to the AND gate circuit 78B. The AND gate circuit 78B outputs the forced switching signal Ws as the forced switching signal Wk during a second predetermined time Tk. Since the state judgment signal Ns output from the latch circuit 72B has the "L" level during the second predetermined time Tk, the forced switching signal Wk becomes the output of the detection signal switching part 70B. The second predetermined time Tk is a period from the time after the first predetermined time Ts has passed or after the PWM signal Wp is input at least once to the time when the state judgment signal NS has the "H" level.

Figure 14:
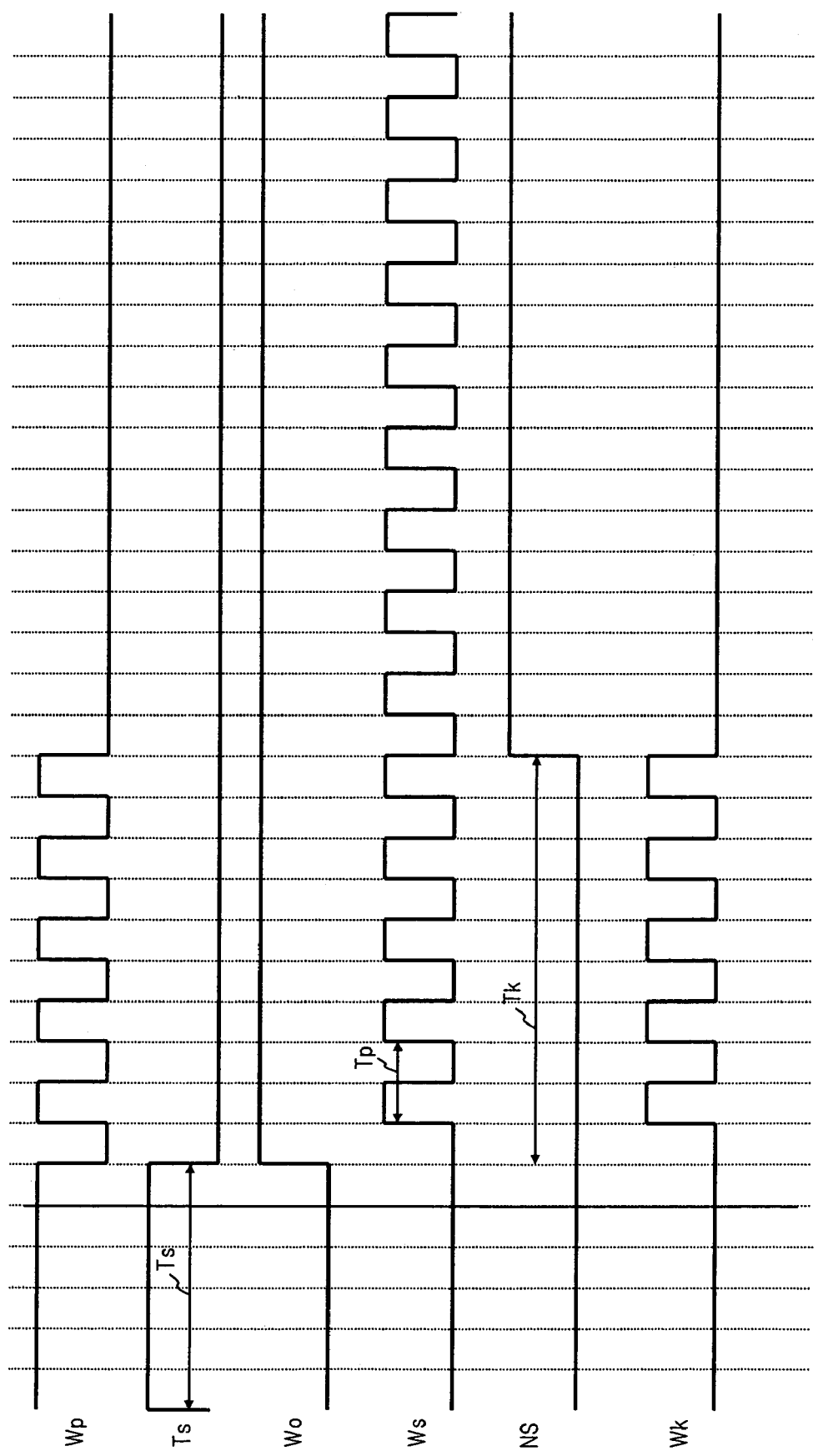
FIG. 14 is a timing diagram showing a motion of each section of a detection signal switching part 70B of the motor in accordance with Embodiment 6.

Specific operations in the motor in accordance with Embodiment 6 will be described below by using FIG. 14. In the motor in accordance with Embodiment 6, if the PWM signal Wp indicating switching operation is not input to the high-frequency switching operation judgment circuit 74B, the high-frequency switching operation judgment circuit 74B holds the PWM operation signal Wo at the "L" level. In the case when the state wherein the PWM operation signal Wo is held at the "L" level continues during the first predetermined time Ts, a signal wherein the "H" level and the "L" level are repeated in the constant cycle Tp is output as the forced switching signal Ws from the forced high-frequency switching circuit 76B. This forced switching signal Ws is output continuously until it is judged that the state is not affected by an induced voltage occurring as a phenomenon peculiar to PWM operation. In other words, the forced switching signal Ws is output continuously during the second predetermined time Tk, that is, until the state judgment signal NS indicating the state not affected by an induced voltage occurring as a phenomenon peculiar to PWM operation is output.

Since the motor in accordance with Embodiment 6 is configured as described above, in the case when the high-frequency switching operation is not carried out at the time of PWM sensorless starting, forced high-frequency switching operation is carried out by the forced switching signal Wk during a constant period, and position detection operation is carried out in response to the high-frequency switching operation. Hence, the motor in accordance with Embodiment 6 can carry out stable sensorless starting.

Furthermore, in the motor in accordance with Embodiment 6, a switching operating part 50B is switching operating means, and the detection signal switching part 70B is state judging means.

Embodiment 7

Figure 15:
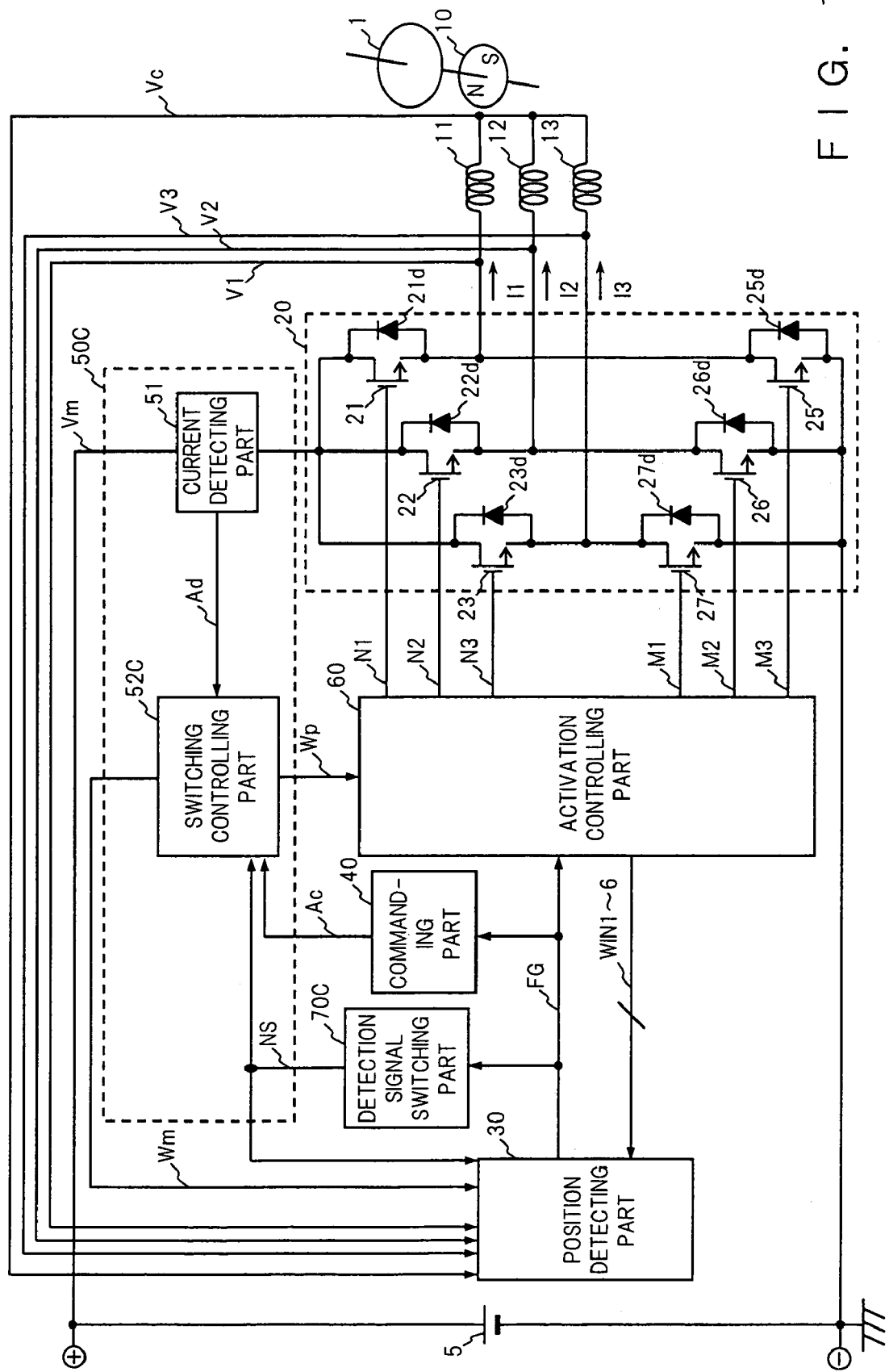
FIG. 15 is a block diagram showing a configuration of a motor in accordance with Embodiment 7 of the present invention.
Figure 16:
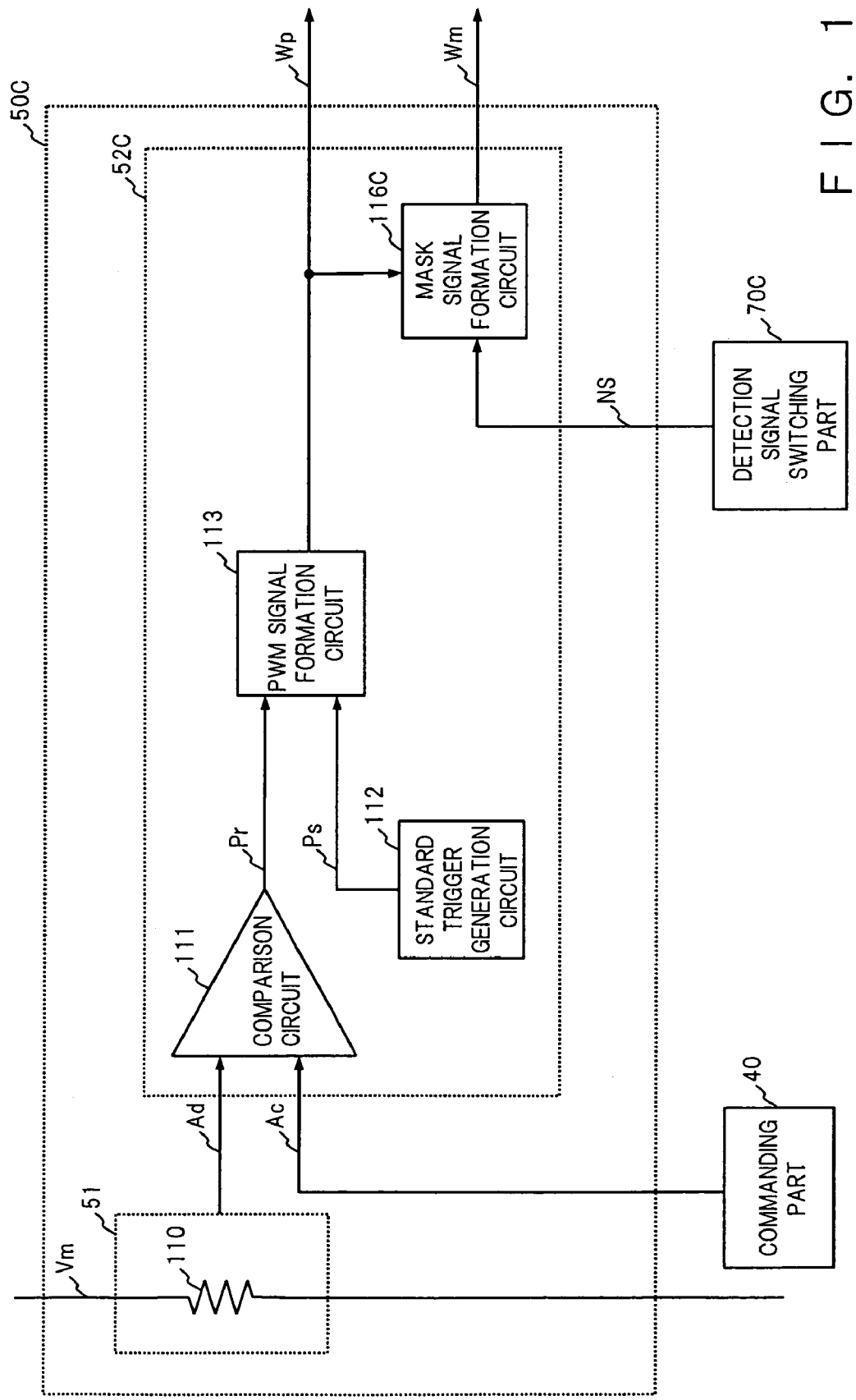
FIG. 16 is a block diagram showing a configuration of a switching operating part 50C of the motor in accordance with Embodiment 7.

A motor in accordance with Embodiment 7 of the present invention will be described below. FIG. 15 is a block diagram showing the configuration of the motor in accordance with Embodiment 7. FIG. 16 is a block diagram showing the configuration of a switching operating part SOC in the motor in accordance with Embodiment 7. The configuration of the motor in accordance with Embodiment 7 is substantially the same as that of the above-mentioned Embodiment 1, except for the switching controlling part 52 and the detection signal switching part 70, and a switching controlling part 52C, shown in FIG. 16, is provided instead of the switching controlling part 52. In addition, the detection signal switching part 70C in accordance with Embodiment 7 is configured to input the state judgment signal NS to the position detecting part 30 and the mask signal formation circuit 116C of the switching controlling part 52C. In the explanations of Embodiment 7, the components having the same functions and configurations as those of Embodiment 1 are designated by the same numerals, and their explanations are omitted.

The switching operating part 50C comprises a current detecting part 51 and the switching controlling part 52C. Its basic configuration is almost the same as the switching operating part 50 in accordance with Embodiment 1.

As shown in FIG. 16, the switching controlling part 52C comprises a comparison circuit 111, a standard trigger generation circuit 112, a PWM signal formation circuit 113 and a mask signal formation circuit 116C. In the switching controlling part 52C, the circuits other than the mask signal formation circuit 116C are the same as those of the switching controlling part 52 shown in FIG. 4. To the mask signal formation circuit 116C, the PWM signal Wp from the PWM signal formation circuit 113 is input, and the state judgment signal NS from the detection signal switching part 70C is input. The mask signal formation circuit 116C outputs the mask signal Wm to the noise elimination circuit 38 of the position detecting part 30. The noise elimination circuit 38 of the position detecting part 30, to which the mask signal Wm is input, eliminates switching noise that is caused by the high-frequency switching operation and superimposed on the voltage comparison signals C1, C2 and C3. The "H" level period of the mask signal Wm is a period wherein the high-frequency switching noise is masked, and the "L" level period of the mask signal Wm is a period wherein position detection is possible.

The specific operation of the switching operating part 50C in the motor in accordance with Embodiment 7 will be described below by using FIG. 17.

Figure 17:
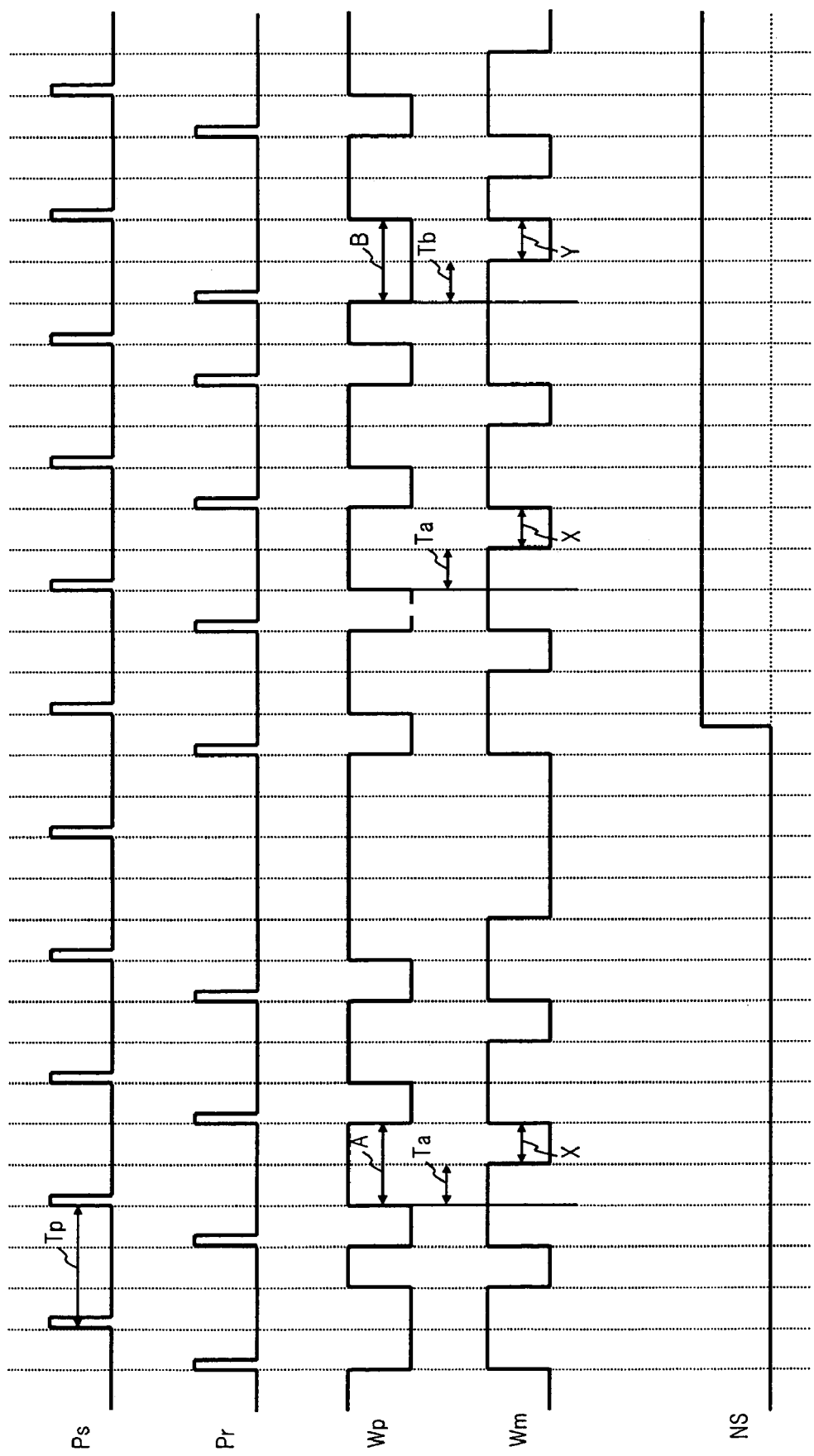
FIG. 17 is a timing diagram showing a motion of each section of a switching operating part 50C of the motor in accordance with Embodiment 7.

In the motor in accordance with Embodiment 7, as shown in FIG. 17, when the state judgment signal NS has the "L" level, the mask signal Wm masks all the periods other than the ON periods of the PWM signal Wp and also masks a third predetermined time Ta after the PWM signal Wp is turned ON. When the state judgment signal NS has the "H" level, the third predetermined time Ta after the PWM signal Wp is turned ON is masked, and a fourth predetermined time Tb after the PWM signal Wp is turned OFF is masked.

Hence, as shown in FIG. 17, when the state judgment signal NS has the "L" level, the rotation position detectable period of the disk 1 and the rotor 10 is, for example, only the period X that is obtained by eliminating the third predetermined time Ta from the ON period A of the PWM signal Wp. Furthermore, when the state judgment signal NS has the "H" level, the period X that is obtained by eliminating the third predetermined time Ta from the ON period A of the PWM signal Wp and the period Y that is obtained by eliminating the fourth predetermined time Tb from the OFF period B of the PWM signal Wp, for example, are the rotation position detectable periods.

As described above, in the motor in accordance with Embodiment 7, the rotation position detectable period of the disk 1 and the rotor 10 is switched in response to the state judgment signal NS, whereby the rotation position detectable period is increased after the state judgment signal NS becomes the "H" level, and PWM sensorless operation with less position errors is possible.

Furthermore, in the motor in accordance with Embodiment 7, the switching operating part 50C is switching operating means, and the detection signal switching part 70C is state judging means.

Embodiment 8

Figure 18:
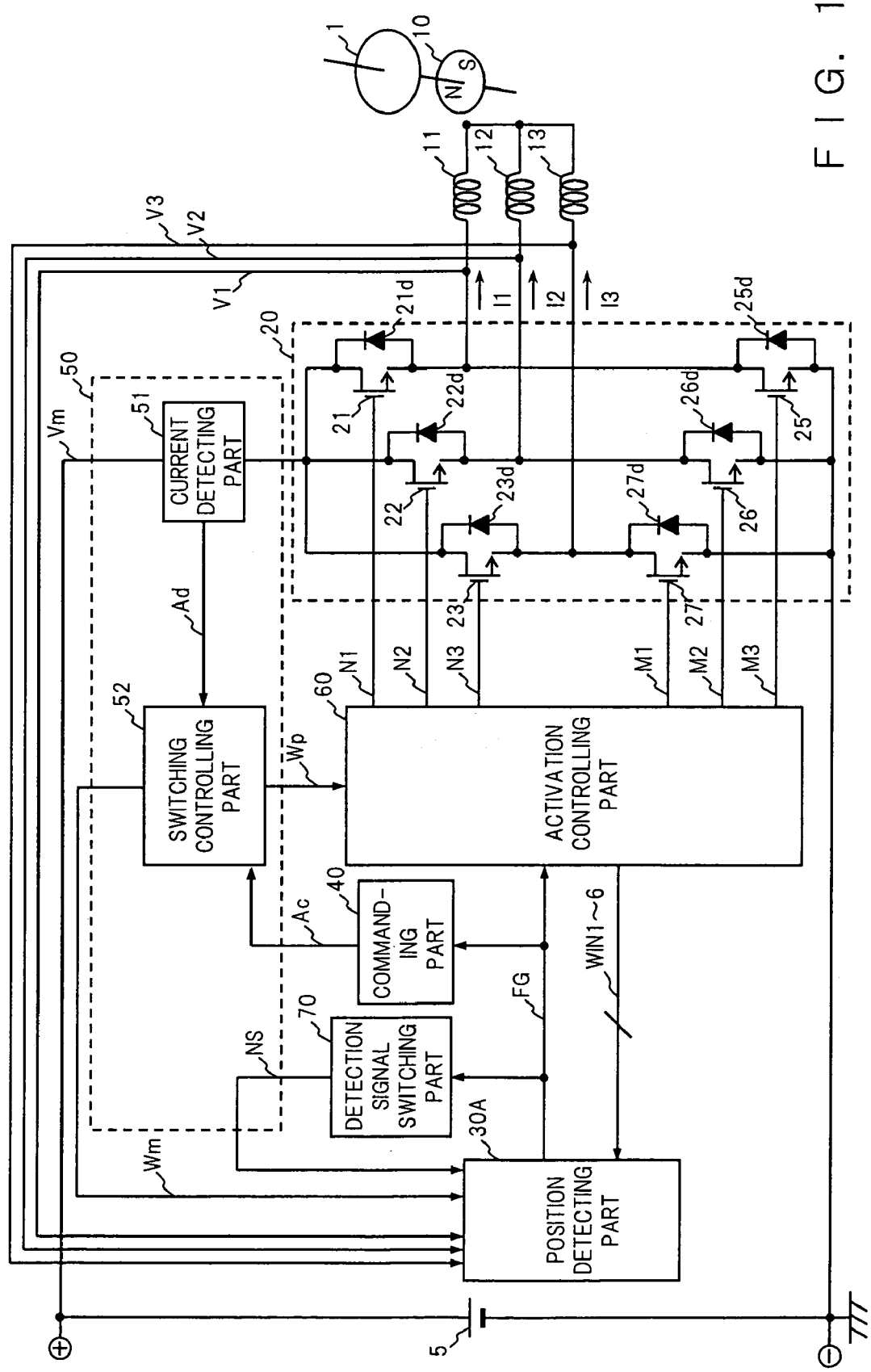
FIG. 18 is a block diagram showing a configuration of a motor in accordance with Embodiment 8 of the present invention.
Figure 19:
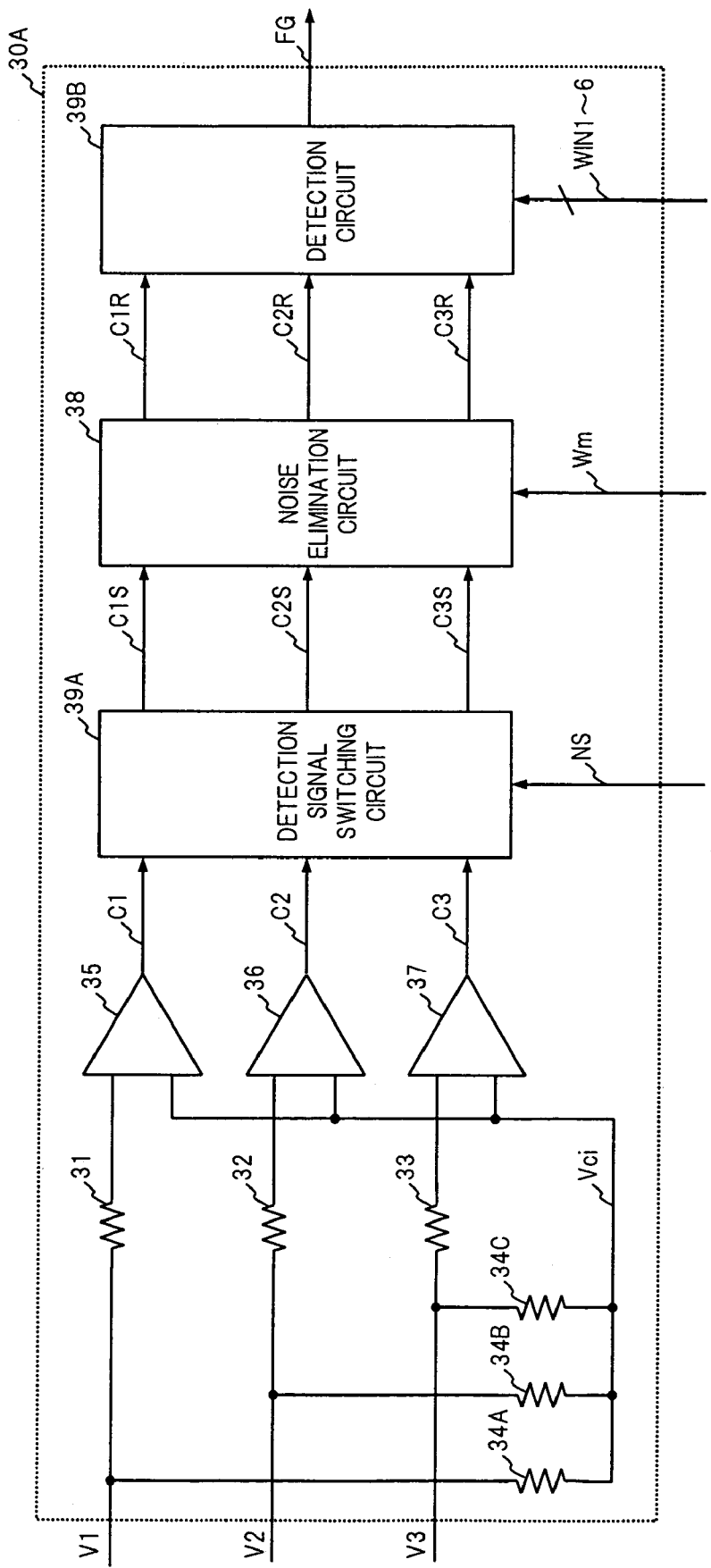
FIG. 19 is a block diagram showing a configuration of position detecting part 30A of the motor in accordance with Embodiment 8.

A motor in accordance with Embodiment 8 of the present invention will be described below. FIG. 18 is a block diagram showing the configuration of the motor in accordance with Embodiment 8. FIG. 19 is a block diagram showing the configuration of a position detecting part 30A in the motor in accordance with Embodiment 8. The configuration of the motor in accordance with Embodiment 8 is substantially the same as that of the above-mentioned Embodiment 1, except for the position detecting part 30, and the position detecting part 30A in accordance with Embodiment 8 has a configuration shown in FIG. 19. In the motor in accordance with the above-mentioned Embodiment 1, the terminal voltages V1, V2 and V3, each generated at one terminal of each of the three-phase windings 11, 12 and 13, and the voltage Vc at the neutral point wherein the other terminals of the windings are connected commonly are input to the position detecting part 30, and the rotation position of the disk 1 and the rotor 10 is detected by the position detecting part 30. In the motor in accordance with Embodiment 8, only the terminal voltages V1, V2 and V3, each generated at one terminal of each of the three-phase windings 11, 12 and 13, are input to the position detecting part 30A, and the rotation position of the disk 1 and the rotor 10 is detected in the position detecting part 30A; in this respect, the configuration is different from that of Embodiment 1. In the explanations of Embodiment 8, the components having the same functions and configurations as those of Embodiment 1 are designated by the same numerals, and their explanations are omitted.

The specific configuration of the position detecting part 30A in accordance with Embodiment 8 shown in FIG. 19 will be described. In the position detecting part 30A, the terminal voltages V1, V2 and V3, each generated at one terminal of each of the three-phase windings 11, 12 and 13, are input to one of the input terminals of each of the voltage comparison circuits 35, 36 and 37. To the other input terminal of each of the voltage comparison circuits 35, 36 and 37, an artificial neutral point voltage Vci artificially formed from the terminal voltages V1, V2 and V3, each generated at one terminal of each of the three-phase windings 11, 12 and 13, is input. The artificial neutral point voltage Vci is formed by connecting resistors 34A, 34B and 34C to the terminal voltages V1, V2 and V3, respectively, each generated at one terminal of each of the three-phase windings 11, 12 and 13, and by commonly connecting the other terminals of the resistors 34A, 34B and 34C. The voltage comparison circuits 35, 36 and 37 directly compare the terminal voltages V1, V2 and V3, each generated at one terminal of each of the three-phase windings 11, 12 and 13, with the artificial neutral point voltage Vci. The circuit configuration after the voltage comparison circuits 35, 36 and 37 is the same as that of the position detecting part 30 in accordance with the above-mentioned Embodiment 1.

As described above, in the motor in accordance with Embodiment 8 of the present invention, stable PWM sensorless operation can be carried out by using a configuration wherein only the terminal voltages V1, V2 and V3, each generated at one terminal of each of the three-phase windings 11, 12 and 13, are used to detect the rotation position of the disk 1 and the rotor 10.

In the motor in accordance with Embodiment 8, the terminal voltages V1, V2 and V3, each generated at one terminal of each of the three-phase windings 11, 12 and 13, are input to the position detecting part 30A; on the other hand, the neutral point voltage of the other terminal is not input; hence, in comparison with the motor in accordance with the above-mentioned Embodiment 1, this embodiment has an effect capable of reducing the number of the input lines to the position detecting part by one. In other words, in Embodiment 8, one wire from the neutral point voltage of the three-phase windings to the position detecting part and one input terminal of the position detecting part can be reduced.

Furthermore, in the motor in accordance with Embodiment 7, the switching operating part 50C is switching operating means, and the detection signal switching part 70C is state judging means.

Still further, the configuration can be modified variously without departing from the spirit of present invention, and it is needless to say that such modified configurations are also included in the scope of the present invention.

Embodiment 9

Figure 20:
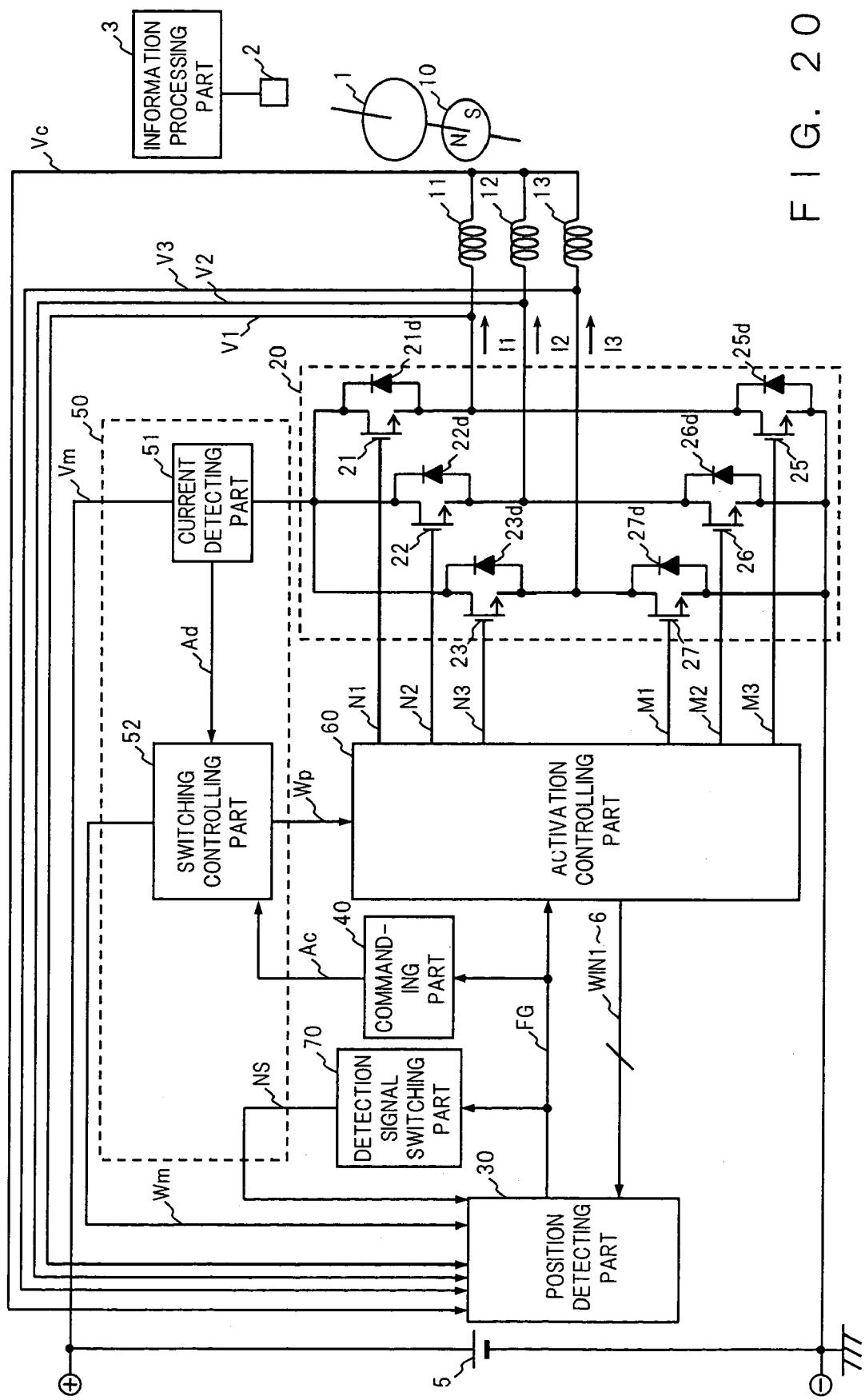
FIG. 20 is a block diagram showing a configuration of a motor in accordance with Embodiment 9 of the present invention.
Figure 21:
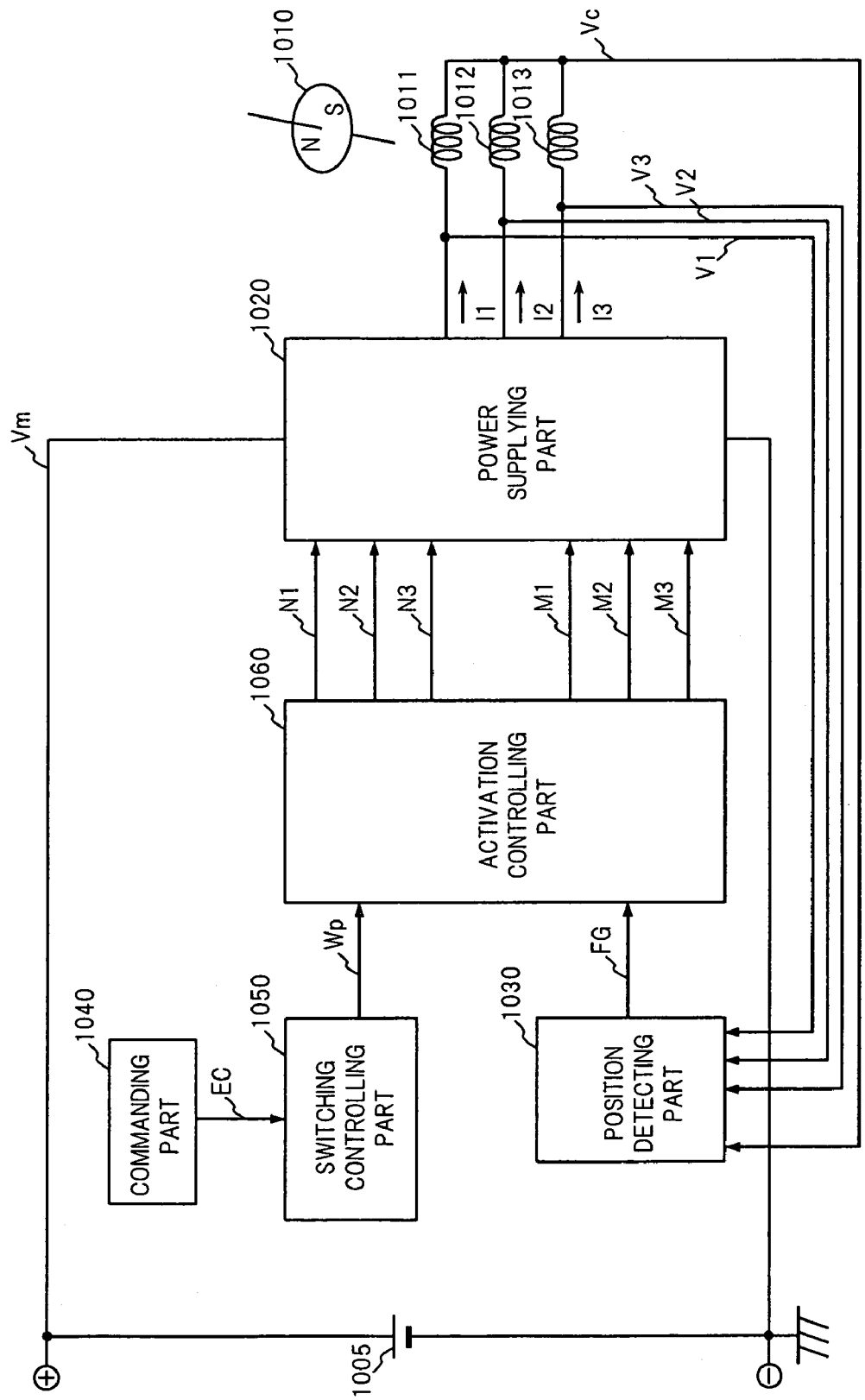
FIG. 21 is the block diagram showing the configuration of the conventional motor.

A disk drive apparatus in accordance with Embodiment 9 of the present invention will be described below. FIG. 20 is a block diagram showing the configuration of the disk drive apparatus in accordance with Embodiment 9.

The disk drive apparatus in accordance with Embodiment 9 has a configuration wherein the motor in accordance with the above-mentioned Embodiment 1 is provided with a head 2 and an information processing part 3. The head 2 outputs a signal for reproducing information signals from the disk 1 being rotating and a signal for recording information signals to the disk 1. The information processing part 3 processes the output signals from the head 2. Since the operations of the respective components of the motor in accordance with Embodiment 9 are the same as those of the above-mentioned Embodiment 1, their explanations are omitted.

With the above-mentioned configuration, even in the disk 1 mounted on the motor in the disk drive apparatus in accordance with Embodiment 9, stable PWM sensorless starting and operation can be carried out without using extra sensors. Hence, the disk drive apparatus in accordance with Embodiment 9 is low in cost and can carry out stable rotation wherein rotation speed can be raised promptly. The disk drive apparatus in accordance with Embodiment 9 has an inexpensive configuration and can obtain signals from the disk 1 promptly and highly accurately, whereby the starting time can be shortened and erroneous detection can be prevented.

In addition, with the configuration in accordance with Embodiment 9, in the disk drive apparatus wherein the rotation and stopping of the disk 1 are repeated during energy saving operation in a notebook personal computer or the like, no starting failure occurs, and the starting time is short, whereby operation having high response speed is possible. Furthermore, PWM operation can be carried out even at the time of starting, whereby power consumption at the time of starting the disk drive apparatus can be lowered.

Although the disk drive apparatus in accordance with Embodiment 9 is configured by using the motor in accordance with Embodiment 1, the disk drive apparatus may be configured by using the motors in accordance with the above-mentioned Embodiments 2 to 8; with this kind of configuration, the disk drive apparatus in accordance with the present invention brings about effects obtained by the motors in accordance with the above-mentioned Embodiments 2 to 8.

In the above-mentioned respective embodiments, the configuration wherein the state of the disk 1 and the rotor 10 is judged by using the position detection pulse signal FG is explained; however, the present invention is not limited to this kind of configuration, and other configurations may be used for judging the state of the disk 1 and the rotor 10.

As clarified by the above-mentioned detailed explanations of the embodiments, the present invention has the following effects.

In the motor in accordance with the present invention, position detection is carried out during the ON period in the state of the beginning of starting, and a signal obtained by logically inverting the position signal is used for activation control as the output signal of the position detecting means, whereby defective starting owing to an induced voltage during PWM operation is prevented, and stable PWM sensorless starting is possible.

Furthermore, the present invention is configured so that the output signal of the position detecting means is switched when the rotor is in a state not affected by an induced voltage during PWM operation, whereby stable PWM sensorless operation is possible.

Still further, the disk drive apparatus in accordance with the present invention is provided with a motor capable of carrying out stable PWM sensorless starting, whereby signals can be obtained promptly and highly accurately from the disk by using an inexpensive configuration, and starting time can be shortened and erroneous detection of rotor position can be prevented.

Although the invention has been described in its preferred form with a certain degree of particularity, it is understood that the present disclosure of the preferred form has been changed in the details of construction and the combination and arrangement of parts may be resorted to without departing from the spirit and the scope of the invention as claimed.

The invention claimed is:

1. A motor comprising:
   a rotor;
   windings of a plurality of phases;
   power supplying means, including a plurality of first drive power transistors and a plurality of second drive power transistors, for supplying electric power to said windings of a plurality of phases;
   position detecting means for detecting the rotation position of said rotor in response to the terminal voltages of said windings of a plurality of phases;
   activation controlling means for controlling activation to said windings of a plurality of phases by said power supplying means in response to a position signal output from said position detecting means;
   commanding means for outputting a speed command signal; and
   switching operation means for causing at least one of said plurality of first drive power transistors and said plurality of second drive power transistors of said power supplying means to perform high-frequency switching operation in response to said speed command signal;
   and that said position detecting means is provided with position detection signal switching means that carries out switching between a detection signal for detecting the rotation position of said rotor and an inverted detection signal generated by inverting the logic of said detection signal and outputs the obtained signal in response to voltage comparison signals obtained by a comparison of outputs between each of the terminal voltages of said windings of non-activation phases and the neutral point voltage of the common potential of said windings of a plurality of phases,
   the output signal of said position detection signal switching means is used as said position signal during the ON operation of said high-frequency switching operation, and
   said position detection signal switching means outputs said inverted detection signal as said position signal at the beginning of starting.

2. The motor in accordance with claim 1, further comprising:
   state judging means for making a judgment as to whether the rotation speed of said rotor, obtained on the basis of said position signal, is higher than a predetermined rotation number or not and for outputting a state judgment signal in the case when the rotation speed is higher than said predetermined rotation number,
   wherein said position detection signal switching means carries out switching between said detection signal for detecting the rotation position of the said rotor and said inverted detection signal generated by inverting the logic of said detection signal when said state judgment signal is input at least once.

3. The motor in accordance with claim 1, wherein said position detection signal switching means carries out switching between said detection signal for detecting the rotation position of said rotor and said inverted detection signal generated by inverting the logic of said detection signal when said position signal is input at least once.

4. The motor in accordance with claim 2, wherein said position detection signal switching means carries out switching between said detection signal for detecting the rotation position of said rotor and said inverted detection signal generated by inverting the logic of said detection signal when a signal obtained by an AND operation of said state judgment signal generated at least once and said position signal generated at least once is input.

5. The motor in accordance with claim 2, wherein
   said position detection signal switching means is provided with switching operation judging means for making a judgment as to whether said high-frequency switching operation is carried out or not, and
   switching is carried out between said detection signal for detecting the rotation position of said rotor and said inverted detection signal generated by inverting the logic of said detection signal when a PWM operation state judgment signal obtained by an AND operation of a PWM operation signal output from said high-frequency switching operation judging means and said state judgment signal is input in the case when said high-frequency switching operation is carried out at least once.

6. The motor in accordance with claim 2, wherein said switching operating means outputs a third predetermined time including the time of change from OFF to ON of said high-frequency switching operation and a fourth predetermined time including the time of change from ON to OFF of said high-frequency switching operation as mask signals.

7. The motor in accordance with claim 5, further comprising:
   forced high-frequency switching means for forcibly carrying out said high-frequency switching operation at least once within a second predetermined time in the case when said PWM operation signal is not output in response to said speed command signal within a first predetermined time after the state of activation starting, wherein said second predetermined time is set at a time elapsed until said state judgment signal is output.

8. The motor in accordance with claim 1, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

9. The motor in accordance with claim 2, wherein said position detecting means detects the rotation position of said rotor by directly comparing the terminal voltages of said windings of a plurality of phases with the voltage at the neutral point of said windings of a plurality of phases or a neutral point, voltage artificially formed from the terminal voltages of said windings of a plurality of phases.

10. The motor in accordance with claim 3, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

11. The motor in accordance with claim 4, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

12. The motor in accordance with claim 5, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

13. The motor in accordance with claim 6, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

14. The motor in accordance with claim 7, wherein said position detecting means detects the rotation position of said rotor by directly comparing the terminal voltages of said windings of a plurality of phases with the voltage at the neutral point of said windings of a plurality of phases or a neutral point voltage artificially formed from the terminal voltages of said windings of a plurality of phases.

15. A disk drive apparatus comprising:
head means for at least carrying out signal reproduction from a disk or carrying out signal recording on said disk;
information processing means for at least processing the output signal of said head means and outputting a reproduced information signal or processing and outputting a recorded information signal to said head means;
a rotor for directly rotating and driving said disk;
windings of a plurality of phases;
power supplying means, including a plurality of first drive power transistors and a plurality of second drive power transistors, for supplying electric power to said windings of a plurality of phases;
position detecting means for detecting the rotation position of said rotor in response to the terminal voltages of said windings of a plurality of phases;
activation controlling means for controlling activation to said windings of a plurality of phases by said power supplying means in response to a position signal output from said position detecting means;
commanding means for outputting a speed command signal; and
switching operation means for causing at least one of said plurality of first drive power transistors and said plurality of second drive power transistors of said power supplying means to perform high-frequency switching operation in response to said speed command signal;
and that said position detecting means is provided with position detection signal switching means that carries out switching between a detection signal for detecting the rotation position of said rotor and an inverted detection signal generated by inverting the logic of said detection signal and outputs the obtained signal in response to voltage comparison signals obtained by a comparison of outputs between each of the terminal voltages of said windings of non-activation phases and the neutral point voltage of the common potential of said windings of a plurality of phases,
the output signal of said position detection signal switching means is used as said position signal during the ON operation of said high-frequency switching operation, and
said position detection signal switching means outputs said inverted detection signal as said position signal at the beginning of starting.

* * * * *